US006866586B2

(12) United States Patent
Oberberger et al.

(10) Patent No.: US 6,866,586 B2
(45) Date of Patent: *Mar. 15, 2005

(54) CASHLESS TRANSACTION CLEARINGHOUSE

(75) Inventors: Michael M. Oberberger, Reno, NV (US); Richard E. Rowe, Reno, NV (US)

(73) Assignee: IGT, Reno, NV (US)

(*) Notice: Subject to any disclaimer, the term of this patent is extended or adjusted under 35 U.S.C. 154(b) by 366 days.

This patent is subject to a terminal disclaimer.

(21) Appl. No.: 09/993,163

(22) Filed: Nov. 16, 2001

(65) Prior Publication Data

US 2002/0077178 A1 Jun. 20, 2002

Related U.S. Application Data

(63) Continuation-in-part of application No. 09/648,382, filed on Aug. 25, 2000, now Pat. No. 6,394,907.
(60) Provisional application No. 60/200,329, filed on Apr. 28, 2000.

(51) Int. Cl.[7] ................................................ A63F 13/00
(52) U.S. Cl. ............................. 463/42; 463/25; 463/20
(58) Field of Search ..................... 463/12, 13, 16–20, 463/25, 40–42; 700/91–93; 273/138.1, 138.2, 143 R; 705/1, 14; 235/375, 379–382; 194/205; 902/2, 4, 5, 23; 713/150, 155, 162; 380/251; 340/5.4, 5.41, 5.42, 5.5

(56) References Cited

U.S. PATENT DOCUMENTS

| | | | | |
|---|---|---|---|---|
| 5,083,271 A | * | 1/1992 | Thacher et al. ............... | 700/92 |
| 5,457,305 A | * | 10/1995 | Akel et al. .................... | 705/45 |
| 5,544,086 A | * | 8/1996 | Davis et al. ................... | 705/68 |
| 5,643,086 A | | 7/1997 | Alcorn et al. ................. | 463/29 |
| 5,761,647 A | | 6/1998 | Boushy ......................... | 705/10 |
| 5,762,552 A | | 6/1998 | Vuong et al. ................. | 463/25 |
| 5,768,382 A | | 6/1998 | Schneier et al. ............. | 380/23 |
| 5,937,066 A | * | 8/1999 | Gennaro et al. ............ | 380/286 |
| 5,970,143 A | | 10/1999 | Schneier et al. | |
| 6,019,283 A | | 2/2000 | Lucero ....................... | 235/380 |

(List continued on next page.)

FOREIGN PATENT DOCUMENTS

| | | | | |
|---|---|---|---|---|
| DE | 3441518 A1 | 5/1986 | ............. | G07F/7/08 |
| DE | 44 22 370 A1 | 1/1996 | ........... | G07F/17/34 |

(List continued on next page.)

OTHER PUBLICATIONS

Introduction to Public–Key Cryptography, http://developer.netscape.com/docs/manuals/security/–pkin/contents.htm, Oct. 9, 1998, downloaded from the Internet on Jan. 8, 2004, pp. 1–20.*

(List continued on next page.)

Primary Examiner—Mark Sager
Assistant Examiner—Steven Ashburn
(74) Attorney, Agent, or Firm—Beyer, Weaver & Thomas LLP

(57) ABSTRACT

A disclosed cashless instrument transaction clearinghouse provides clearinghouse server including a network interface allowing the cashless instrument transaction clearinghouse to communicate with a number of gaming properties and a processor configured to enable the validation of cashless instruments at a gaming property different from where the cashless instrument was generated. Methods are provided that allow a plurality of cashless gaming devices located at different gaming properties to communicate with one another via the cashless instrument transaction clearinghouse in a secure manner using symmetric and asymmetric encryption techniques. Further, to reduce the possibilities of theft and fraud, the methods allow a receiver of a message to authenticate an identity of a sender of a message.

65 Claims, 13 Drawing Sheets

U.S. PATENT DOCUMENTS

| | | | |
|---|---|---|---|
| 6,099,408 A | 8/2000 | Schneier et al. | 463/29 |
| 6,104,815 A | 8/2000 | Alcorn et al. | 380/251 |
| 6,106,396 A | 8/2000 | Alcorn et al. | 463/29 |
| 6,149,522 A | 11/2000 | Alcorn et al. | 463/29 |
| 6,154,543 A * | 11/2000 | Baltzley | 380/255 |
| 6,165,072 A | 12/2000 | Davis et al. | 463/29 |
| 6,178,510 B1 | 1/2001 | O'Connor et al. | 713/201 |
| 6,302,793 B1 * | 10/2001 | Fertitta et al. | 463/25 |
| 6,368,219 B1 | 4/2002 | Szrek et al. | 463/42 |
| 6,508,709 B1 | 1/2003 | Karmarkar | 463/43 |
| 6,560,581 B1 * | 5/2003 | Fox et al. | 705/51 |
| 2001/0032878 A1 * | 10/2001 | Tsiounis et al. | 235/379 |
| 2002/0032656 A1 * | 3/2002 | Chen | 705/43 |
| 2003/0050831 A1 * | 3/2003 | Klayh | 705/14 |
| 2003/0216967 A1 * | 11/2003 | Williams | 705/14 |

FOREIGN PATENT DOCUMENTS

| | | | |
|---|---|---|---|
| EP | 0 805 424 A2 | 11/1997 | G07F/17/32 |
| EP | 0933717 A2 * | 1/1999 | G06F/17/60 |
| WO | WO 95/24689 | 9/1995 | G06F/155/00 |
| WO | WO 99/01188 | 1/1999 | |
| WO | 01/76710 A2 | 10/2001 | |
| WO | 01/84516 A2 | 11/2001 | |

OTHER PUBLICATIONS

Schneier B., "Applied Cryptography. Second Edition", 1996, Applied Cryptography, Protocols, Algorithms, and Source Code in C, pp. 31–38, 50–51, XP002248999, ISBN: 0–471–11709–9.

* cited by examiner

CASHLESS TRANSACTION CLEARINGHOUSE

CROSS-REFERENCE TO RELATED APPLICATIONS

This application is a continuation-in-part of U.S. patent application Ser. No. 09/648,382 entitled "AN AWARD TICKET CLEARINGHOUSE", filed Aug. 25, 2000 now U.S. Pat. No. 6,394,907; which claims priority under 35 U.S.C. § 119(e) from co-pending U.S. Provisional Patent Application No. 60/200,329, filed Apr. 28, 2000, naming Rick Rowe as inventors, and titled "AN AWARD TICKET CLEARINGHOUSE," each of which is incorporated herein by reference in its entirety for all purposes.

BACKGROUND OF THE INVENTION

This invention relates to game playing services for gaming machines such as slot machines and video poker machines. More particularly, the present invention relates to methods of utilizing cashless instruments on gaming machines.

There are a wide variety of associated devices that can be connected to a gaming machine such as a slot machine or video poker machine. Some examples of these devices are lights, ticket printers, card readers, speakers, bill validators, ticket readers, coin acceptors, display panels, key pads, coin hoppers and button pads. Many of these devices are built into the gaming machine or components associated with the gaming machine such as a top box which usually sits on top of the gaming machine.

Typically, utilizing a master gaming controller, the gaming machine controls various combinations of devices that allow a player to play a game on the gaming machine and also encourage game play on the gaming machine. For example, a game played on a gaming machine usually requires a player to input money or indicia of credit into the gaming machine, indicate a wager amount, and initiate a game play. These steps require the gaming machine to control input devices, including bill validators and coin acceptors, to accept money into the gaming machine and recognize user inputs from devices, including key pads and button pads, to determine the wager amount and initiate game play. After game play has been initiated, the gaming machine determines a game outcome, presents the game outcome to the player and may dispense an award of some type depending on the outcome of the game.

As technology in the gaming industry progresses, the traditional method of dispensing coins or tokens as awards for winning game outcomes is being supplemented by ticket dispensers which print ticket vouchers that may be exchanged for cash or accepted as credit of indicia in other gaming machines for additional game play. An award ticket system, which allows award ticket vouchers to be dispensed and utilized by other gaming machines, increases the operational efficiency of maintaining a gaming machine and simplifies the player pay out process. An example of an award ticket system is the EZ pay ticket system by International Game Technology of Reno, Nevada. Award ticket systems and systems using other cashless mediums are referred to as cashless systems.

Cashless systems, such as the EZ pay ticket system, provide advantages to both game players and casino operators. For example, many players find it more convenient to carry an award ticket than a large number of coins. For gaming machine operators cashless systems tend to reduce gaming machine operating costs. For example, the infrastructure needed to remove and count indicia of credit (e.g. coins, tokens, bills) from the gaming machine may be eliminated or minimized when it is replaced with a cashless system, which reduces the gaming machine operating costs. Further, coin dust, which is potentially damaging to the components of the gaming machine (e.g. electronic components) may be eliminated or minimized when coin acceptors are replaced with the cashless system.

Currently, cashless systems have become very popular and have been embraced by customers. For example, ticket vouchers that are generated upon cash-out and redeemed for cash or gaming machine credits within a particular casino are well accepted by game players. However, the ticket vouchers are only redeemable at the casino or the local property where the ticket was generated. Thus, the customer is not allowed to take the ticket voucher generated at one casino property and redeem the ticket voucher at another casino property. The limited redemption capabilities of cashless systems, including ticket vouchers, may be undesirable to an entertainment corporation that owns multiple casino properties. The entertainment corporation may desire that their customers have the ability to take a ticket voucher generated in one property to any of the other properties owned by the entertainment corporation.

Also, multi-site cashless capabilities may be desirable for an area or region such as the Las Vegas strip where a customer could cash out in casino A where a ticket voucher is generated. The customer could then take this ticket down the Las Vegas strip and into casino B where it could be inserted into a gaming machine's bill acceptor and redeemed for credit. In this example, casino A and casino B may or may not be owned by the same entertainment corporation. This type of multi-site validation capability is not possible with current cashless systems. Thus, in view of the above, it would be desirable to provide apparatus and methods for cashless systems that allow a cashless medium, including an award ticket voucher, generated at one site using one type of cashless system to be validated at a second site using the same or a different cashless system.

SUMMARY OF THE INVENTION

This invention addresses the needs indicated above by providing a cashless instrument transaction clearinghouse including a network interface allowing the cashless instrument transaction clearinghouse to communicate with a number of gaming properties and a processor configured to enable the validation of cashless instruments at a gaming property different from where the cashless instrument was generated. Methods are provided that allow a plurality of cashless gaming devices located at different gaming properties to communicate with one another via the cashless instrument transaction clearinghouse in a secure manner using symmetric and asymmetric encryption techniques. Further, to reduce the possibilities of theft and fraud, the methods allow a receiver of a message to authenticate an identity of a sender of a message.

One aspect of the present invention provides a cashless instrument transaction network for generating cashless transactions between a plurality of separate gaming properties, each of which generates and validates cashless instruments. The cashless instrument transaction network may be generally characterized as comprising: 1) a cashless instrument transaction clearinghouse, 2) at least one cashless gaming device, located at each of the plurality of separate gaming properties, that communicates with cashless instrument clearinghouse; and 3) a network allowing communication between the cashless instrument clearinghouse and the cashless gaming devices. The cashless instrument transaction clearinghouse in the cashless instrument transaction network may comprise: (i) a network interface allowing the cashless instrument transaction clearinghouse to communicate with each of the separate gaming properties; and (ii) a processor configured or designed to (a) receive cashless instrument validation requests via the network interface from a first property for a cashless instrument presented at the first property where the cashless instrument was generated at a second property (b) send information, via the network, to the second property requesting the second property to approve or reject the cashless instrument validation request.

In particular embodiments, the processor may be further designed or configured to encrypt and decrypt cashless transaction information. For instance, the cashless transaction clearinghouse may further comprise a memory device that stores cashless gaming device public encryption keys for each of the cashless gaming devices in the cashless transaction network and a memory device that stores a clearinghouse private encryption key. With the encryption keys, the processor may be further designed or configured for one or more of the following: 1) to decrypt cashless transaction information encrypted with a cashless gaming device private encryption key using a corresponding cashless gaming device public encryption key, 2) to encrypt cashless transaction information using the public encryption keys, 3) to decrypt cashless transaction information encrypted with a clearinghouse public encryption key using the clearinghouse private encryption key and 4) to encrypt cashless transaction information using the clearinghouse private encryption key.

In other embodiments, the cashless gaming devices may encrypt and may decrypt cashless transaction information. For instance, the gaming devices may each further comprise a memory device storing a clearinghouse public encryption key and a gaming device private encryption key. With the encryption keys, the gaming devices may encrypt cashless transaction information using the clearinghouse public encryption key and may decrypt cashless transaction information encrypted with a clearinghouse private key using the clearinghouse public encryption key. Further, the gaming devices may encrypts cashless transaction information using the gaming device private encryption key and may decrypt cashless transaction information encrypted with a gaming device public encryption key using the gaming device private encryption key.

In yet other embodiments, the network may comprise a local area network, a wide area network, the Internet, a private intranet and combinations thereof. The cashless gaming device may selected from the group consisting of a gaming machine, a hand-held computing device, a clerk validation terminal and a cashless server. Further, the processor in clearinghouse may be further designed or configured to allow promotional credits issued to a cashless instrument at a first gaming property to be used for game play at a second gaming property.

Another aspect of the present invention provides a method in a cashless instrument transaction clearinghouse of communicating with a plurality of gaming properties each of which generates and validates cashless instruments. The method may be generally characterized as comprising: 1) sending a clearinghouse public encryption key to a cashless gaming device at each of the plurality of gaming properties wherein the clearinghouse public encryption key is part of a public-private encryption key pair generated at the clearinghouse; 2) receiving a public encryption key from a gaming device at each of the plurality of gaming properties wherein each public encryption key is a part of a public-private encryption key pair generated at each property; 3) authenticating a sender of each of the public encryption keys received at the clearinghouse; 4) generating a message for each property wherein the message includes information at least encrypted with the property's public encryption key and a clearinghouse private encryption pair that is part of the public-private encryption key pair generated at the clearinghouse; and sending the message to each property where the cashless instrument transaction clearinghouse at least (i) receives cashless instrument validation requests from a first property for a cashless instrument presented at the first property where the cashless instrument was generated at a second property and (ii) sends information to a second gaming property requesting the second property to approve or reject the cashless instrument validation request.

Another aspect of the present invention provides a method in an cashless instrument transaction clearinghouse of communicating with a plurality of gaming properties each of which generates and validates cashless instruments. The method may be generally characterized as comprising: 1) receiving a first message addressed to a second property from a first property wherein the message includes encrypted cashless transaction information; 2) authenticating an identity of the first message sender; 3) decrypting the encrypted cashless transaction information; 4) identifying an address for the second property; 5) encrypting the cashless transaction information for second message addressed to the second property; and sending the second message with the encrypted cashless transaction information to the second property where the cashless instrument transaction clearinghouse at least (i) receives cashless instrument validation requests from a first property for a cashless instrument presented at the first property where the cashless instrument was generated at a second property and (ii) sends information to a second gaming property requesting the second property to approve or reject the cashless instrument validation request. In particular embodiments, the method may also comprise one or more of the following: a) operating on the cashless transaction information, b) storing the cashless transaction information and c) translating the cashless transaction information from a first format used by the first property to a second format used by the second property.

In other embodiments, the cashless information in the first message may be encrypted with a symmetric encryption key. In addition, the cashless transaction information in the first message may be encrypted using a public-private encryption key pair. Further, the first message may include an encrypted symmetric encryption key. Thus, the method may comprise decrypting the symmetric encryption key. The symmetric encryption key may be encrypted at the first property using a public-private encryption key pair. In another embodiment, the symmetric encryption key may be encrypted twice at the first property using a first property private encryption key from a first public-private encryption key pair and using a clearinghouse public encryption key from a second public-private encryption key pair. Thus, the symmetric encryption key may be decrypted at the clearinghouse using a first property public encryption key from the first public-private encryption key pair and may be decrypted using a clearinghouse private encryption key from the second public-private encryption key pair.

In yet other embodiments, the cashless transaction information for the second message may be encrypted with a symmetric encryption key. As another example, the cashless transaction information for the second message may be encrypted using a public-private key pair. Thus, the method may also comprise: a) generating a first symmetric encryption key; b) encrypting the cashless transaction information for the second message with the first symmetric encryption key; c) encrypting the first symmetric encryption key; and 4) generating the second message with the encrypted first symmetric encryption key and the encrypted cashless transaction information. In particular, the first symmetric encryption key may be encrypted at the clearinghouse using a clearinghouse private encryption key from a first public-private encryption key pair and using a public encryption key from a second public-private encryption key pair.

In one embodiment, the method may comprise receiving from the second party a third message and authenticating the message sender. For example, the method may comprise: i) receiving from the second party a third message comprising at least encrypted cashless transaction information and an encrypted second symmetric encryption key; ii) decrypting the second symmetric encryption key and iii) comparing the second symmetric encryption key to the first symmetric encryption key to authenticate the message sender.

Another aspect of the present invention provides a method in a first cashless gaming device located at a first gaming property which generates and validates cashless instruments of communicating instruments via a cashless instrument transaction clearinghouse with a second cashless gaming device located at a second gaming property which generates and validates cashless. The method may be generally characterized as comprising: 1) generating cashless transaction information; 2) encrypting the cashless transaction information; and 3) sending a first message addressed to the second gaming property with at least the cashless transaction information to the cashless transaction clearinghouse where the cashless instrument transaction clearinghouse at least (i) receives cashless instrument validation requests from a first property for a cashless instrument presented at the first property where the cashless instrument was generated at a second property and (ii) sends information to a second gaming property requesting the second property to approve or reject the cashless instrument validation request. The gaming device may be selected from the group consisting of a gaming machine, a cashless server, a hand-held computing device and a clerk validation terminal. In particular embodiments, the method may also comprise: a) generating the first message and/or b) receiving a second message from the cashless instrument transaction clearinghouse; and authenticating a sender of the second message.

In other embodiments, the cashless transaction information may be encrypted with one or more of a symmetric encryption key, a public encryption key of a public-private encryption key pair, a private encryption key of a public-private encryption key pair and combinations thereof. Thus, the method may decrypting cashless transaction information included in the second message where the information is decrypted with one or more of a symmetric encryption key, a public encryption key of a public-private encryption key pair, a private encryption key of a public-private encryption key pair and combinations thereof. Further, the method may comprise one or more of the following: i) generating a symmetric encryption key and encrypting the cashless instrument information with the symmetric encryption key, ii) encrypting the symmetric encryption key; generating a second message with the encrypted symmetric encryption key and the encrypted cashless instrument information; and sending the second message to the cashless instrument transaction clearinghouse.

Another aspect of the present invention may provide a method in a cashless gaming device of authenticating a public encryption key from a cashless transaction instrument clearinghouse. The method may be generally characterized as comprising: 1) generating a symmetric encryption key using a seed shared with the clearinghouse; 2) encrypting a first information sequence with the symmetric encryption key; 3) sending a first message with the encrypted first information sequence to the clearinghouse, 4) receiving a second message with an encrypted second information sequence and encrypted clearinghouse public encryption key from the clearinghouse; 5) decrypting the second information sequence with the symmetric encryption key; and 6) authenticating the sender of the second message using the first information sequence and the second information sequence where the cashless instrument transaction clearinghouse at least (i) receives cashless instrument validation requests from a first gaming property for a cashless instrument presented at the first property where the cashless instrument was generated at a second property and (ii) sends information to a second gaming property requesting the second property to approve or reject the cashless instrument validation request.

In particular embodiments, the method may also comprise one or more of the following: a) decrypting the clearinghouse public encryption key with the symmetric encryption key and storing the clearinghouse public encryption key, b) comparing the first information sequence to the second information sequence, c) receiving the seed from the clearinghouse, d) generating the first message, e) encrypting information with the clearinghouse public encryption key and sending a message with the encrypted information to the clearinghouse. In other embodiments, the first information sequence may be a random noise sequence. Further, the first information sequence and the second information sequence are identical. Finally, the cashless instrument is selected from the group consisting of a smart card, a debit card, a barcoded ticket and an EZ pay ticket voucher.

Another aspect of the present invention provides a method in a cashless instrument transaction clearinghouse of sending a public encryption key to a cashless gaming device. The method may be generally characterized as comprising: 1) generating a symmetric encryption key using a seed shared with the cashless gaming device; 2) receiving a first message with an encrypted information sequence from the cashless gaming device; 3) decrypting the information sequence with the symmetric encryption key; 4) encrypting the information sequence with the symmetric encryption key; 5) encrypting a clearinghouse public encryption key with the symmetric encryption key; and 6) sending a second message, with (i) the information sequence encrypted with symmetric encryption key and (ii) the public encrypted key encrypted with the symmetric encryption key, to the clearinghouse; where the cashless instrument transaction clearinghouse at least (i) receives cashless instrument validation requests from a first gaming property for a cashless instrument presented at the first property where the cashless instrument was generated at a second property and (ii) sends information to a second gaming property requesting the second property to approve or reject the cashless instrument validation request.

In particular embodiments, the method may also comprise: a) generating a encryption key pair including the clearinghouse public key and a clearinghouse private key and/or b) generating the second message. The information sequence may be a random noise sequence. The cashless instrument may be selected from the group consisting of a smart card, a debit card, a bar-coded ticket and an EZ pay ticket voucher.

Another aspect of the present invention provides, a method in a cashless gaming device of sending a public encryption key to a cashless instrument transaction clearinghouse and authenticating the public encryption key has been received by the clearinghouse. The method may be generally characterized as comprising: a) generating a symmetric encryption key using a seed shared with the clearinghouse; b) encrypting a cashless gaming device public encryption key with the symmetric encryption key; c) encrypting the cashless gaming device public encryption key with a clearinghouse public encryption key; d) sending a first message with the doubly encrypted cashless gaming device public encryption key to the clearinghouse; e) receiving a second message with an encrypted information sequence; f) decrypting the information sequence with the clearinghouse public encryption key; g) decrypting the information sequence decrypted with clearinghouse public encryption key with the symmetric encryption key; and h) authenticating the sender of the second message using the cashless gaming device public encryption key and the information sequence where the cashless instrument transaction clearinghouse at least (i) receives cashless instrument validation requests from a first gaming property for a cashless instrument presented at the first property where the cashless instrument was generated at a second property and (ii) sends information to a second gaming property requesting the second property to approve or reject the cashless instrument validation request.

In particular embodiments, the method may also comprise: 1) comparing the information sequence to the cashless gaming device public encryption key, 2) generating an encryption key pair including the cashless gaming device public key and a cashless gaming device private key, 3) generating the first message, 4) receiving the seed from the clearinghouse, 5) receiving the clearinghouse public encryption key from the clearinghouse, and 6) authenticating an identity of the sender of the clearinghouse public encryption key.

Another aspect of the present invention provides a method in a cashless instrument transaction clearinghouse of receiving a public encryption key from a cashless gaming device and authenticating an identity of the cashless gaming device. The method may be generally characterized as comprising: 1) generating a symmetric encryption key using a seed shared with the cashless gaming device; 2) receiving a first message with an encrypted cashless gaming device public encryption key from the cashless gaming device; 3) decrypting the information sequence with the symmetric encryption key; 4) decrypting the cashless gaming device public encryption key with the symmetric encryption key; 5) decrypting the cashless gaming device public encryption key with a clearing house private encryption key; 6) encrypting the cashless gaming device public encryption key with the clearinghouse public encryption key; 7) encrypting the cashless gaming device public encryption key encrypted with the clearinghouse public encryption key with the symmetric encryption key; and 8) sending a second message with the doubly encrypted cashless gaming device public encryption key to the clearinghouse where the cashless instrument transaction clearinghouse at least (i) receives cashless instrument validation requests from a first gaming property for a cashless instrument presented at the first property where the cashless instrument was generated at a second property and (ii) sends information to a second gaming property requesting the second property to approve or reject the cashless instrument validation request. The method may also comprise: a) storing the cashless gaming device public encryption key and/or b) sending information encrypted with the cashless gaming device public encryption key to the cashless gaming device.

Another aspect of the invention pertains to computer program products including a machine-readable medium on which is stored program instructions for implementing any of the methods described above. Any of the methods of this invention may be represented as program instructions and/or data structures, databases, etc. that can be provided on such computer readable media.

These and other features of the present invention will be presented in more detail in the following detailed description of the invention and the associated figures.

DESCRIPTION OF THE PREFERRED EMBODIMENTS

Figure 1:
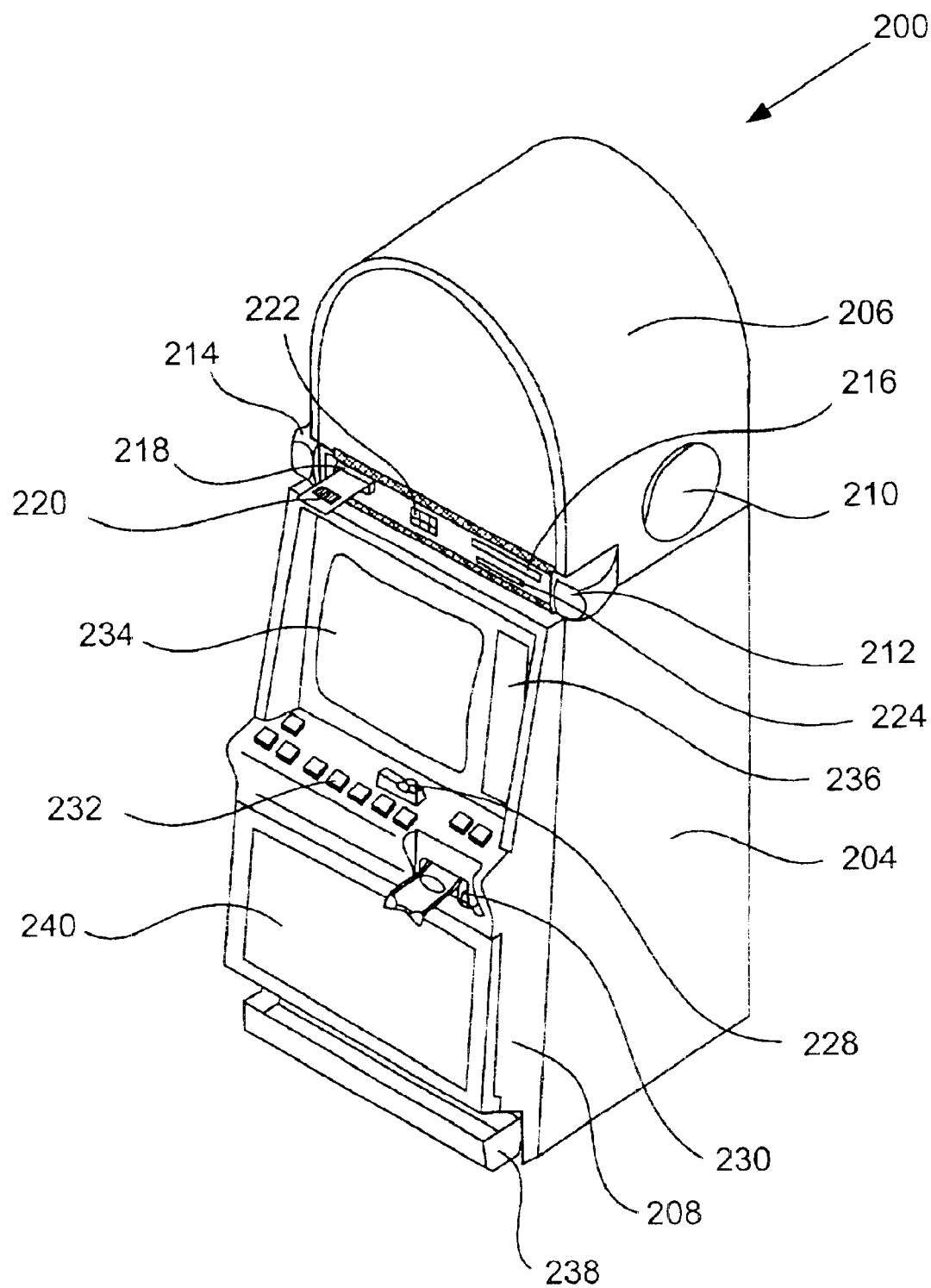
FIG. 1 is a perspective drawing of a gaming machine having a top box and other devices.

Turning first to FIG. 1, a video gaming machine 200 of the present invention is shown. Machine 200 includes a main cabinet 204, which generally surrounds the machine interior (not shown) and is viewable by users. The main cabinet includes a main door 208 on the front of the machine, which opens to provide access to the interior of the machine. Attached to the main door are player-input switches or buttons 232, a coin acceptor 228, and a bill validator 230, a coin tray 238, and a belly glass 240. Viewable through the main door is a video display monitor 234 and an information panel 236. The display monitor 234 will typically be a cathode ray tube, high resolution flat-panel LCD, or other conventional electronically controlled video monitor. The information panel 236 may be a back-lit, silk screened glass panel with lettering to indicate general game information including, for example, the number of coins played. The bill validator 230, player-input switches 232, video display monitor 234, and information panel are devices used to play a game on the game machine 202. The devices are controlled by circuitry (not shown) housed inside the main cabinet 204 of the machine 200. Many possible games, including traditional slot games, video slot games, video poker, and video keno, may be provided with gaming machines of this invention.

The gaming machine 200 includes a top box 206, which sits on top of the main cabinet 204. The top box 206 houses a number of devices, which may be used to add features to a game being played on the gaming machine 200, including speakers 210, 212, 214, a ticket printer 218 which may print bar-coded tickets 220, a key pad 222 for entering player tracking information, a florescent display 216 for displaying player tracking information, a card reader 224 for entering a magnetic striped card containing player tracking information. Further, the top box 206 may house different or additional devices than shown in FIG. 1. For example, the top box may contain a bonus wheel or a back-lit silk screened panel which may be used to add bonus features to the game being played on the gaming machine. During a game, these devices are controlled and powered, in part, by circuitry (not shown) housed within the main cabinet 204 of the machine 200.

Understand that gaming machine 200 is but one example from a wide range of gaming machine designs on which the present invention may be implemented. For example, not all suitable gaming machines have top boxes or player tracking features. Further, some gaming machines have two or more game displays—mechanical and/or video. And, some gaming machines are designed for bar tables and have displays that face upwards. As another example, a game may be generated in on a host computer and may be displayed on a remote terminal or a remote gaming device. The remote gaming device may be connected to the host computer via a network of some type such as a local area network, a wide area network, an intranet or the Internet. The remote gaming device may be a portable gaming device such as but not limited to a cell phone, a personal digital assistant, and a wireless game player. Still further, some machines may be designed entirely for cashless systems. Such machines may not include such features as bill validators, coin acceptors and coin trays. Instead, they may have only ticket readers, card readers and ticket dispensers. Those of skill in the art will understand that the present invention, as described below, can be deployed on most any gaming machine now available or hereafter developed.

Returning to the example of FIG. 1, when a user wishes to play the gaming machine 200, he or she inserts cash through the coin acceptor 228 or bill validator 230. In addition, the player may use a cashless instrument of some type to register credits on the gaming machine 200. For example, the bill validator 230 may accept a printed ticket voucher, including 220, as an indicia of credit. As another example, the card reader 224 may accept a debit card or a smart card containing cash or credit information that may be used to register credits on the gaming machine. Typically, the information contained on the cashless instrument, including the ticket voucher, smart card or debit card, is validated by a cashless system. The cashless instrument, including the ticket voucher, smart card or debit card, may have been generated at the same property, for example a first casino where the gaming machine 200 is located or the ticket may have been generated at another property for example a second casino. Details of the components of a cashless system and validation methods used in a preferred embodiment of a cashless system are described with reference to FIGS. 2–7.

The cashless instrument typically contains information used to register credits on the gaming machine, including gaming machine 200, and validate the registration transaction. For example, when a ticket voucher is used as a cashless instrument, the printed ticket voucher may contain information including: 1) a ticket value, 2) a ticket issue date, 3) a ticket issue time, 4) a ticket transaction number, 5) a machine ID, 6) a ticket issue location and 7) a ticket owner. Information such as the ticket value, the ticket issue date, the ticket issue time, the ticket number and the machine ID may be common to cashless systems that generate and validate tickets issued at a single property. However, information such as the ticket issue location and the ticket owner may be needed to allow multi-site generation and validation of cashless instruments. In addition, other types of information, besides the information listed above, may be stored on the cashless instrument. For example, the ticket may contain information regarding a promotional prize that may be won by the player when the ticket voucher is utilized in the gaming machine 200. The promotional prize may involve multiple properties and particular types of gaming machines.

As another example, cashless instrument may be used to provide promotional credits to a game player. Promotional credits may be loaded onto the gaming machine 200 for game play only but may not be cashed out. A player may use the promotional credits to play the gaming machine 200 and any winnings from the promotional credits may be cashed out by the player. Using the present invention, the promotional credits may be issued on a cashless instrument at one site and played on gaming machines at another site as part of a multi-site promotion.

The information on the cashless instrument may be recorded on the cashless instrument when the cashless instrument is generated. For example, in the case of the ticket voucher, the generation of the ticket voucher may refer to the actual printing of the ticket voucher on paper or some other medium. A unique bar-code may be printed on the ticket voucher which may be read with a bar-code scanner to obtain information from the ticket. The ticket voucher, including 220, may be printed from a printer, including printer 218. In the case of the smart card or debit card, the generation of the smart card or debit card refers to storing or encoding this information on the smart card or debit card. The generation of the debit card or smart card may occur when the smart card or debit card is inserted into the card reader 224 in the gaming machine 200 or at another site where smart cards or debit cards are issued. For example, smart cards or debit cards may be generated at ATM like terminals, at a cashier station when a player cashes out or prepaid smart cards or debits may be purchased within the gaming property (e.g. casino).

During the course of a game, a player may be required to make a number of decisions, which affect the outcome of the game. For example, a player may vary his or her wager on a particular game, select a prize for a particular game, or make game decisions which affect the outcome of a particular game. The player may make these choices using the player-input switches 232, the video display screen 234 or using some other device which enables a player to input information into the gaming machine. During certain game events, the gaming machine 200 may display visual and auditory effects that can be perceived by the player. These effects add to the excitement of a game, which makes a player more likely to continue playing. Auditory effects include various sounds that are projected by the speakers 210, 212, 214. Visual effects include flashing lights, strobing lights or other patterns displayed from lights on the gaming machine 200 or from lights behind the belly glass 240.

After the player has completed a game, a cashless instrument may be generated at the gaming machine 200. The cashless instrument may be a printed ticket voucher, a smart card, debit card or other cashless medium. For example, the player may decide to cashout and may receive the ticket 220 from the printer 218, which may be used for further games or to redeem a prize. Further, the player may receive a ticket 220 for food, merchandise, game services or other promotions from the printer 218 that may be used at the gaming property where the gaming machine is located or at other gaming properties. The player may view cashless instrument transaction information on the video display screen 234 or the florescent screen 216. For instance, when a player cashes out from the gaming machine, the value stored on the cashless instrument may be displayed using the video display 234. As another example, when a promotion ticket 220 is printed out from the printer 218 that is valid at a number of other gaming properties, a map may be displayed on the video display screen indicating where the other gaming properties are located.

Figure 2:
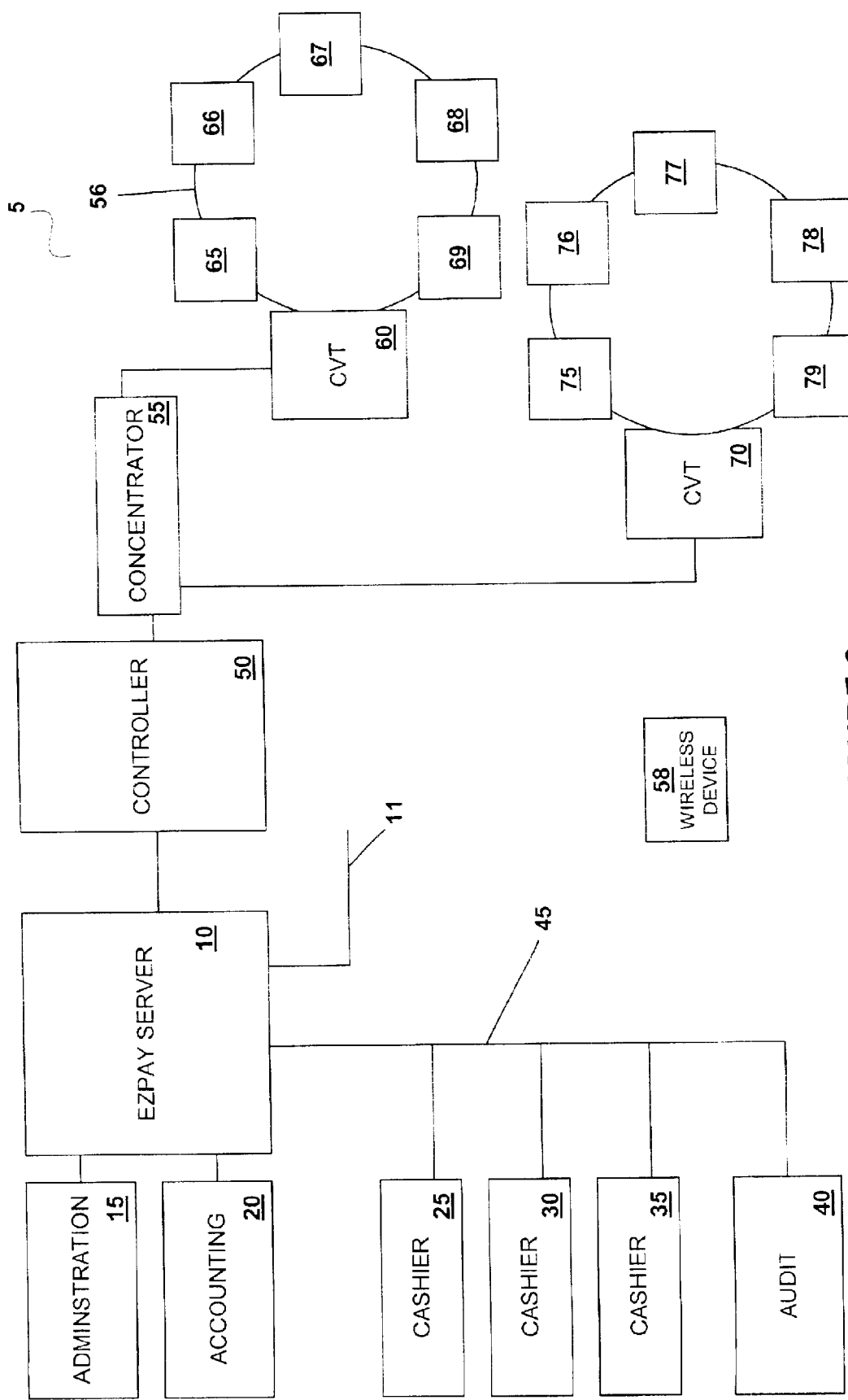
FIG. 2 is a block diagram of the components of an cashless system using the EZ pay ticket voucher system.

FIG. 2 is a block diagram of the components of a cashless system using the EZ pay ticket voucher system for one embodiment of the present invention. A cashless system is the hardware components and software components needed to generate and validate cashless instruments. Components of an cashless system may include 1) data acquisition hardware, 2) data storage hardware, 3) cashless instrument generation and validation hardware (e.g. printers, card readers, ticket acceptors, validation terminals, etc.), 3) auditing software, 4) cashless instrument validation software and 5) database software. Many types of cashless systems are possible and are not limited to the components listed above or embodiments such as the EZ pay ticket voucher system. Typically, an cashless system is installed at each property utilizing cashless instruments. To allow multi-site validations of cashless instruments, the cashless systems at each property are linked to a cashless instrument transaction clearinghouse. The relation of multiple cashless systems connected to a cashless instrument transaction clearinghouse are described with reference to FIG. 3. The details of an cashless system at one property are described below with reference to FIG. 2.

Returning to FIG. 2, a first group of gaming machines, 65, 66, 67, 68, and 69 is shown connected to a first clerk validation terminal (CVT) 60 and a second group of gaming machines, 75, 76, 77, 78 and 79 is shown connected to a second CVT 70. All of the gaming machines print ticket vouchers which may be exchanged for cash or accepted as credit of indicia in other gaming machine located within the property 5. In this example, the ticket voucher serves as a cashless instrument. In addition, the gaming machines may accept ticket vouchers issued at a different property from property 5 where the different property utilizes the same or a different cashless system as compared to property 5.

When the CVTs are not connected to one another, a ticket voucher printed from one gaming machine may be only be used as indicia of credit in another gaming machine which is in a group of gaming machines connected to the same clerk validation terminal. For example, a ticket voucher printed from gaming machine 65 might be used as credit of indicia in gaming machines 66, 67, 68 and 69, which are each connected to the CVT 60, but not in gaming machines 75, 76, 77, 78, and 79, which are each connected to the CVT 70. In an analogous manner, when the cashless systems from one property are not connected together then a ticket vouchers generated from gaming machine 66 may be not be used at property different from property 5.

The CVTs, 60 and 70, store cashless instrument transaction information corresponding to the outstanding cashless instrument, including ticket vouchers, smart cards and debit cards, that are waiting for redemption. In this embodiment, the CVTs are separate from the gaming machine. However, the cashless instrument information may be also stored within each gaming machine or one gaming machine may functionally act as a CVT for a group of gaming machines eliminating the separate CVT hardware. In addition, cashless instrument transaction information may be stored in a cashless server including the EZ pay server 10. The cashless instrument transaction information may be used when the tickets are validated and cashed out or redeemed in some other manner. The CVTs 60 and 70 may store the information for the ticket vouchers printed by the gaming machines connected to the CVT. For example, CVT 60 stores ticket voucher information for ticket vouchers printed by gaming machines 65, 66, 67, 68, and 69. When a ticket is printed out, ticket information is sent to the CVT using a communication protocol of some type from the gaming machine. For example, the gaming machine may send transaction information to the CVT which is part of the cashless system using the slot data system manufactured by Bally's Gaming Systems (Alliance Gaming Corporation, Las Vegas, Nev.) or the slot acquisition system manufacture by IGT, Reno, Nev.

In this embodiment, when a player wishes to cash out a ticket, the player may redeem vouchers printed from a particular gaming machine at the CVT associated with the gaming machine or any other CVT which is part of the cashless system associated with the CVT. For example, since CVT 60 and CVT 70 are connected as part of a single cashless system to the EZ pay server 10, a player may redeem vouchers or utilize vouchers at the gaming machines, the CVT's (60 or 70), the cashiers (25, 30, 35, and 40) or the wireless cashiers 58. The CVTs, cashiers, wireless cashiers and gaming machines may be referred to as "cashless validation sites." To cash out the ticket voucher, the ticket voucher is validated by comparing information obtained from the ticket with information stored within the CVT. After a ticket voucher has been cashed out, the CVT marks the ticket paid in a database to prevent a ticket voucher with similar information from being cashed multiple times.

Not all cashless systems may utilize CVTs, many of the functions of the CVT may be transferred to the cashless server, including the EZ pay server 10, eliminating the function within the CVT. For instance, the cashless instrument transaction information may be stored in the cashless server instead of the CVT. Thus, the need to store cashless instrument transaction information within the CVT may be eliminated.

In this embodiment using the EZ pay system, multiple groups of gaming machines connected to CVTs are connected together in a cross validation network 45. The cross validation network is typically comprised of one or more concentrators 55 which accepts inputs from two or more CVTs and enables communications to and from the two or more CVTs using one communication line. The concentrator is connected to a front end controller 50 which may poll the CVTs for ticket voucher information. The front end controller is connected to an EZ pay server 10 which may provide a variety of information services for the award ticket system including accounting 20 and administration 15.

In this invention, one hardware and software platform allowing cashless instruments to be utilized at all of the cashless validation sites (e.g. cashier stations, gaming machines, wireless cashiers and CVTs) within a single property and across multiple properties is referred to as a "cashless server". In this embodiment, the EZ pay server 10 may function as the cashless server. Usually, the cashless server is a communication nexus in the cross validation network. For instance, the EZ pay server is connected to the cashiers, wireless devices, remote cashless instrument transaction clearinghouse, CVTs and the gaming machines via the CVTs.

The cross validation network allows ticket vouchers generated by any gaming machine connected to the cross validation to be accepted by other gaming machines in the cross validation network 45. Additionally, the cross validation network allows a cashier at a cashier station 25, 30, and 35 to validate any ticket voucher generated from a gaming machine within the cross validation network 45. To cash out a ticket voucher, a player may present a ticket voucher at one of the cashier stations 25, 30, and 35 or to a game service representative carrying a wireless gaming device for validating ticket vouchers. A more complete discussion of the details of the wireless gaming device 58, including hardware and utilization, are described in copending U.S. patent application Ser. No. 09/544,844 entitled a WIRELESS GAME ENVIRONMENT filed Apr. 7, 2000 by Rowe the entire specification of which is incorporated herein by reference. Information obtained from the ticket voucher is used to validate the ticket by comparing information on the ticket with information stored on one of the CVTs connected to the cross validation network. In addition, when the ticket voucher was issued at another property, the information on the ticket may be stored at the other property. Thus, to validate the ticket voucher, the EZ pay server may have to communicate with the cashless instrument transaction clearinghouse via the remote connection 11 to obtain the information necessary to validate the ticket voucher.

As tickets are validated, this information may be sent to audit services computer 40 providing audit services, the accounting computer 20 providing accounting services or the administration computer 15 providing administration services. In another embodiment, all of these services may be provided by the cashless server including the EZ pay server 10. Examples of auditing services, which may be provided by cashless system software residing on the auditing computer 40 include 1) session reconciliation reports, 2) soft count reports, 3) soft count verification reports, 4) soft count exception reports, 5) machine ticket status reports and 5) security access report. Examples of accounting services, which may be provided by cashless system software residing on the accounting computer 20 include 1) ticket issuance reports, 2) ticket liability reports, expired ticket reports, 3) expired ticket paid reports and 4) ticket redemption reports. Examples of administration services, which may be provided by cashless system software residing on the administration computer 15 include 1) manual ticket receipt, 2) manual ticket report, 3) ticket validation report, 4) interim validation report, 5) validation window closer report, 6) voided ticket receipt and 7) voided ticket report.

Figure 3:
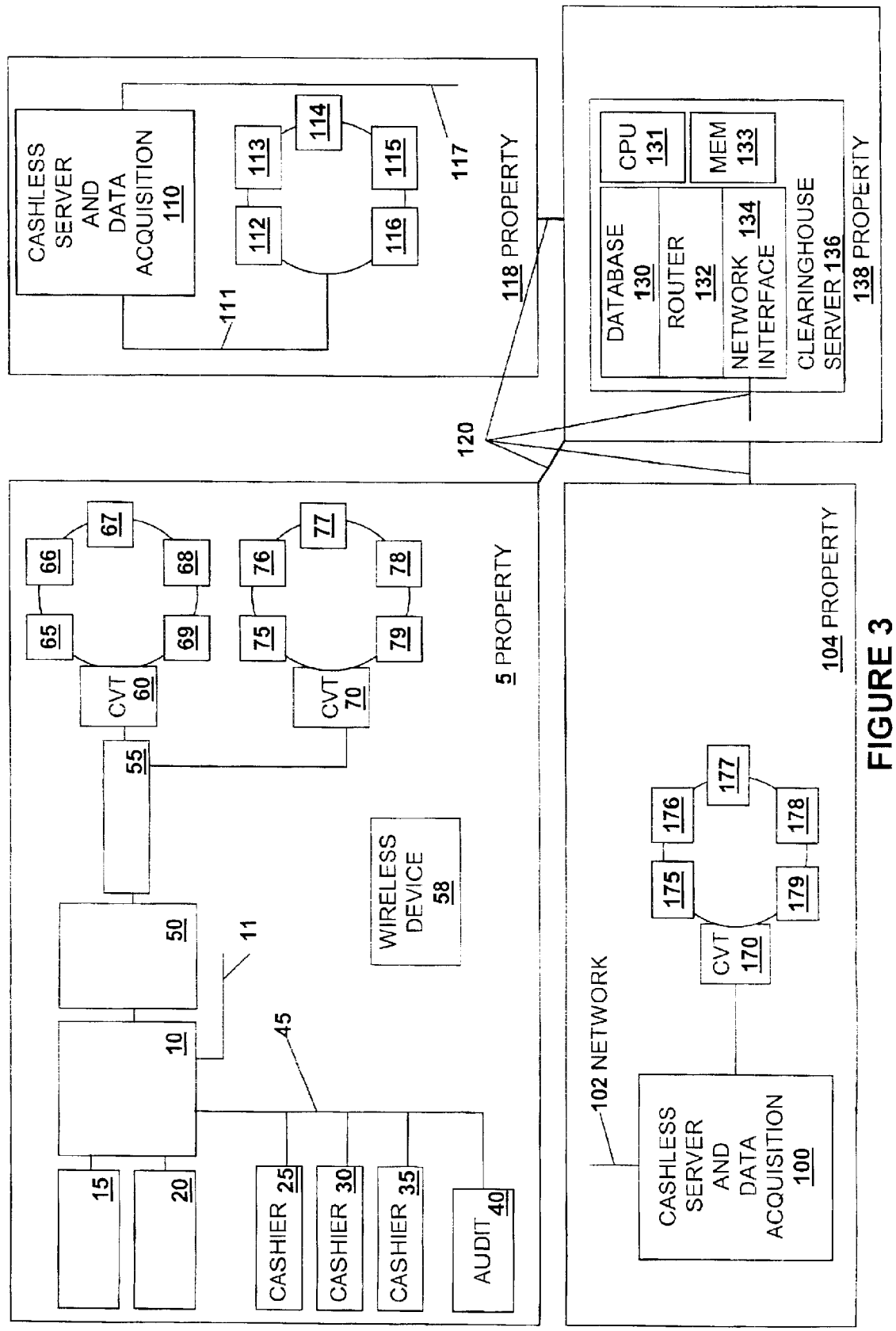
FIG. 3 is a block diagram of cashless systems at multiple properties connected to a cashless instrument transaction clearinghouse server.

FIG. 3 is a block diagram of cashless systems at multiple gaming properties connected to a cashless instrument transaction clearinghouse server. At property 5 (described with reference to FIG. 2), property 104 and property 118, three different embodiments of cashless systems are shown. At property 104, gaming machines 175, 176, 177, 178, 179 send information to the clerk validation terminal 170. The CVT 170 sends information to the cashless server and data acquisition system 100. In this embodiment, the functions of the controller 50 and concentrator 55, as described with reference to FIG. 2, are combined into the cashless server and data acquisition 100. The cashless instrument used on property 104 may be smart cards, magnetic cards, ticket vouchers, combinations of the three or other cashless mediums.

The cashless server 100 contains a communication interface used to send information on cashless instruments generated on property 104 to the clearinghouse server 136 or request information on cashless instruments issued at other properties, including property 5 and property 118, that are being validated at property 104 from the clearinghouse server 136. The cashless instrument transaction information sent to the cashless server 100 from the clearinghouse server 136 and received by the clearing house server from the cashless server 100 is transmitted via the network connection 102. Details of information transmitted between the cashless servers including 10, 100, 110 and the clearinghouse server 136 in regards to multi-property cashless instrument validation are described with reference to FIGS. 4, 5, 6 and 7.

At property 118, gaming machines 112, 113, 114, 115 and 116 are connected to the cashless server and data acquisition system 110 via the local network 111. The local network 111 may be a wireless or wired connection system including fiber, copper or wireless cellular, combinations of all three or other connection systems. A separate CVT is not shown in this embodiment. The functions of the CVT including storage of ticket information may be built into one or more the gaming machines including 112, 113, 114, 115 and 116 or may be built into the cashless server 110. The information sent to the cashless server 100 from the clearinghouse server 136 and received by the clearing house server 136 from the cashless server 100 is transmitted via the network connection 102.

In one embodiment, the clearinghouse server resides on property 138 separate from the other properties, including property 5, property 118 and property 104, containing the cashless servers including 10, 100 and 100. In other embodiments, the clearinghouse server 136 may reside at the same property as one of the cashless servers. Communication between the clearinghouse server 136 and the two or more cashless servers, including cashless servers 10, 100, 110, may be performed via the network connections 120 and the network interface 134 residing within the clearinghouse server 134. The connections between the cashless servers and the clearinghouse server 136 including 11, 102, 117 and 120, may comprise a dedicated communication network.

Components of the cashless instrument transaction clearinghouse server 136 may include 1) a memory storage unit for storing cashless instrument transaction information in a transaction database 130, 2) a functional router 132 enabling communication between the clearinghouse server and different properties, 3) a CPU 131, 4) a memory 133 containing software for implementing the clearinghouse functions and 5) the network interface. The transaction database 130 may contain on-going and past cashless instrument transactions processed using the clearinghouse server 136. The transaction database 130 may be implemented using Microsoft NT (Microsoft, Redmond, Wash.) and SQL (server query language). The cashless servers, including 10, 100 and 110, may also utilize this database technology.

Cashless instrument transaction information for two or more gaming properties may be stored in the clearinghouse server transaction database 130. The properties may be owned by the same or different entities. The transaction database 130 may be accessed remotely by the properties, including 5, 104, and 118, utilizing the clearinghouse server 136. Further, the transaction database 130 may be used with analysis software to analyze transactions routed through the clearinghouse server 136. An transaction analysis interface is described with reference to FIG. 8.

The transaction database 130 may be partitioned to according to properties or ownership of properties to limit access to the database 130. For example, when property 5, property 104 and property 118 are each owned by different entities, each property may only analyze cashless instrument transactions relating to cashless instruments generated and validated at their own property stored at the clearinghouse server 136. Thus, the owners of property 5 may access information relating to cashless instruments generated at property 5 and validated at properties 104 and 118 using the clearinghouse server 136 and the owners of property 5 may access information relating to cashless instruments generated at properties 104 and 118 validated at property 5. However, the owners of property 5 would not be able to access information in the database regarding cashless instruments generated at property 118 and validated at property 104. When more than one property is owned by a single entity, the single entity may be able to access cashless instrument transaction information relating to ownership of all of the properties owned by the single entity. For instance, when the single entity owns properties 5 and 104, the single entity may access the transaction database 130 for transactions relating to cashless instruments generated at properties 5 and 104 and validated at any of the properties using the clearinghouse server 136. Additionally, the single entity may access the transaction database 130 for transactions relating to cashless instruments generated at any of the properties and validated at properties 5 and 104.

The router 132 may contain routing information that allows the clearinghouse server 136 to determine where a cashless instrument was generated. The routing information is used when a cashless instrument is validated at a property different from the property where it was generated. For example, routing information is needed when a cashless instrument is generated at property 5 but the cashless instrument is validated at property 104. Each cashless instrument may be generated with a unique property identifier stored within the cashless instrument. When a validation request for the cashless instrument is received by the clearinghouse server, a property routing table stored within the router may be used by the server to determine where the cashless instrument was generated and communication information allowing the clearinghouse server 136 to communicate with the cashless server where the cashless instrument was generated.

The requirements associated with accounting and reporting of the cashless instrument information are dependent on the regulations within the jurisdiction. That being the case, the system is adaptable to those particular regulations. In general, a cashless instrument with an award amount may be considered to be analogous to a personal check written by the property where it was generated. When the cashless instrument is validated, it is essentially cashed. This implies that the property where the cashless instrument was generated must maintain a database of data related to those cashless instruments that were created on its property. This is analogous to maintaining a bank account whose sole purpose is to cover the cashless instruments that were generated at the property. This property is usually responsible for maintaining its cashless instrument database and validating cashless instruments. When a request to validate a cashless instrument is received by the cashless system at a particular gaming property, the property has the option of validating or rejecting the request. Once the property validates the cashless instrument, it is typically the responsibility of that property to insure its own cashless instrument transaction database is updated. At that time, the property which generated the cashless instrument, now must transfer the funds to the property requesting the validation. The fund transfers may occur with each transaction or could be compiled in a batch to cover multiple ticket validation transactions on a periodic basis, e.g. once a night. The cashless instrument transaction clearinghouse facilitates all associated electronic fund transfers (EFTs) and acts as a third party between the parties. Details of these transactions are described with reference to FIGS. 4, 5, 6 and 7.

Figure 4:
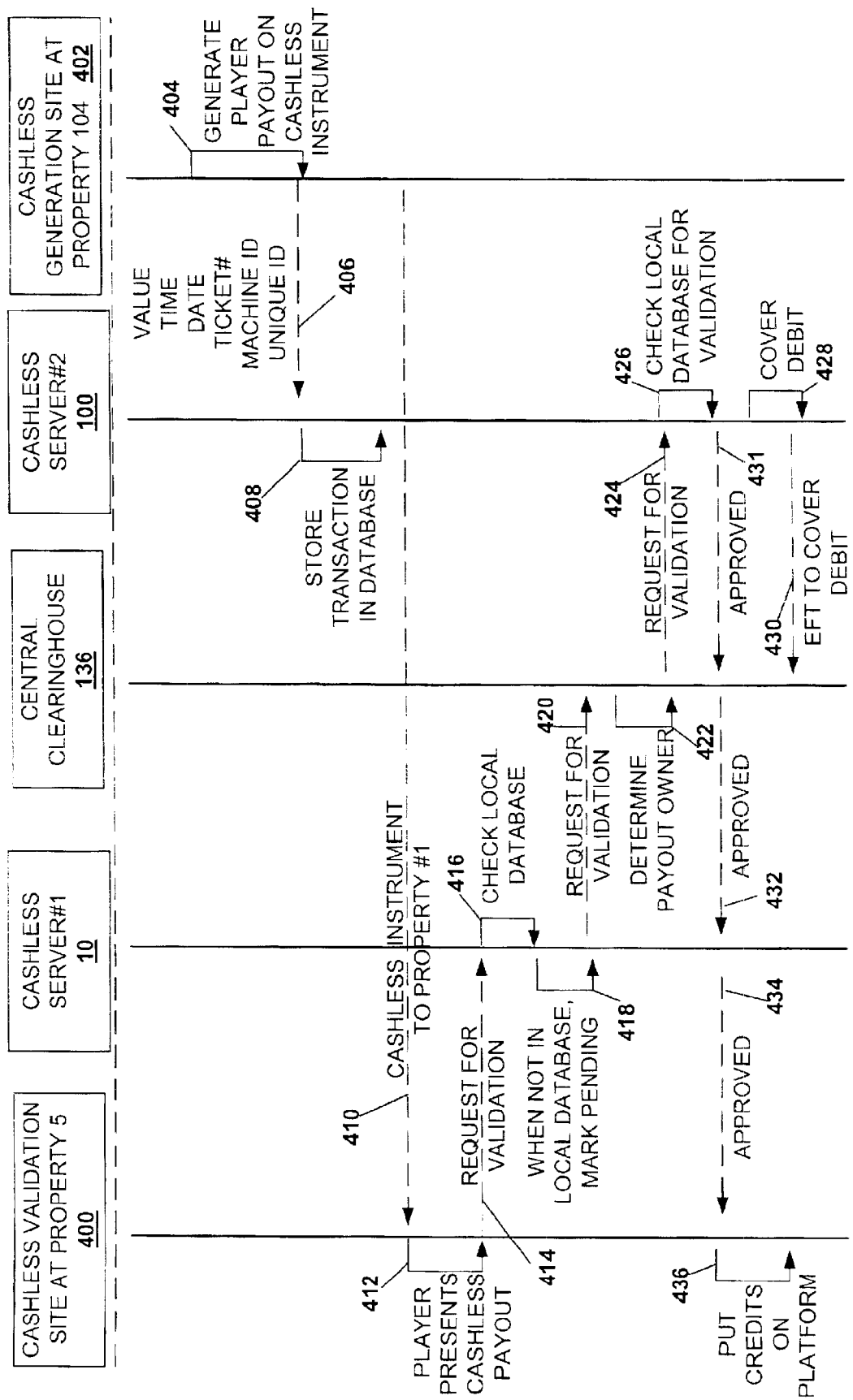
FIG. 4 is an interaction diagram for a cashless instrument transaction between a clearinghouse, cashless servers, and cashless generators/validators where the cashless instrument is generated at a different location from where it is validated.

FIG. 4 is an interaction diagram for a cashless instrument transaction between a clearinghouse, cashless servers, and cashless generators/validators where the cashless instrument is generated at a different location from where it is validated. In 404, a player payout (e.g. award) is generated on a cashless instrument at a cashless instrument generation site 402 at property 100. The cashless instrument generation site may include a gaming machine, a clerk validation terminal, a wireless validation terminal and a cashier station. The cashless instrument may include a printed ticket voucher (e.g. EZ pay ticket), a smart card, a debit card and other cashless mediums. In 406, when the cashless instrument is generated, cashless instrument transaction information, including 1) a value, 2) an issue date, 3) an issue time, 4) a transaction number unique to the transaction, 5) a machine ID that generated the cashless instrument, 6) an issue location and 7) an owner, may be transmitted to the cashless server 100. The cashless instrument transaction information is also stored on the cashless instrument when the cashless instrument is generated in 404. In 408, the cashless server may store the cashless instrument transaction information in a database. The transaction information stored in the database is used when the cashless instrument is validated. The validation process may be invoked when the cashless instrument is redeemed for cash or when the cashless instrument is used in a gaming machine or other device that accepts the cashless instrument. The validation process involves comparing the cashless instrument transaction information stored on the cashless instrument with the cashless instrument transaction information stored in the cashless server database.

In 410, a game player takes the cashless instrument generated at property 100 to property 5. In 412, the game player presents the cashless instrument for a cashless payout at a cashless transaction validation site 400 at property 5. The cashless transaction validation site may include a gaming machine, a cashier station, a clerk validation terminal, a wireless validation device and any other devices which accept cashless instruments. For instance, when a debit card is used as the cashless instrument, the game player may be able to directly deposit the award on the debit card into a bank account accessible to the game player. In 414, a validation request is sent from the cashless transaction validation site 400 to the cashless server 10. The validation request may be an information packet containing the transaction information stored on the cashless instrument in 404 and stored in the cashless server database in 408.

In 416, the cashless server may check the local cashless instrument transaction database on the cashless server to determine if the cashless instrument was generated at property 5. The cashless server may check the local cashless instrument transaction database in a number of ways to determine whether a transaction record for the cashless instrument resides in the database. The database search technique may depend on what information is stored in the local database and what information is stored on the cashless instrument. When the cashless instrument was generated at a property using a different cashless system than the property where the cashless instrument is validated, the type and amount of cashless instrument transaction information stored on the cashless instrument may differ from the type and amount of cashless instrument transaction information stored on the local cashless instrument transaction instrument database. Thus, the search technique may depend on determining a common set of transaction information stored on the cashless instrument being validated and stored in the cashless instrument transaction database. For instance, when the cashless instrument contains a machine ID and the cashless instrument transaction database stores a list of all the local machine IDs, the cashless server 10 may search the local cashless instrument transaction database to determine whether the cashless instrument was generated on one of the local machines at the property 5. As another example, when the cashless instrument contains transaction information on the property where the cashless instrument was generated or the owner of the cashless instrument (e.g. the owner of the property), the cashless server 10 may quickly determine whether the cashless instrument was generated at the local property 5.

In 418, when the cashless instrument was not generated locally, the cashless server may mark the validation request pending in a local database and send a request for validation to the central clearinghouse in 420. The request for validation from the cashless server 10 to the cashless instrument transaction clearinghouse 136 may contain all or some subset of the information stored on the cashless instrument being validated. In addition, the request for validation may contain information about the cashless transaction validation site. For example, the identification information about the cashless transaction validation site 400, the property 5 where the cashless transaction validation site is being validated and the owner of the property may be included in the request for validation message.

As in 414, the request for validation in 420 may be an information packet of some type sent using a pre-determined communication protocol between the cashless server 10 and the central clearinghouse 136. The communication protocol used to transmit transaction information between the cashless transaction validation site 400 and the cashless server 10 in 414 may be the same or different than the communication protocol used to transmit the transaction information between the cashless server 10 and the cashless instrument transaction clearinghouse 136 in 420.

In 422, the cashless instrument transaction clearinghouse determines the owner of the cashless instrument (e.g. the property where the cashless instrument was generated). The clearinghouse 136 determines the owner based upon information received in the validation request in 420 and based upon information stored in the clearinghouse 136. In 424, using routing information stored within the clearinghouse 136, a request for validation is sent from the clearinghouse 136 to the property where the cashless instrument was generated (i.e. property 104 in this embodiment). The request for validation is an information packet in a communication protocol of some type. The transaction information contained within the information packet is sufficient to allow the cashless server 100 at the cashless generation site 402 at property 104 to validate the cashless instrument. The communication protocol used to transmit the transaction information between the cashless server 10 and the clearinghouse 136 in 420 may be the same or different than the communication protocol used to transmit the transaction information between the cashless instrument transaction clearinghouse 136 and the cashless server 100 in 424. For example, the communication protocols may be different when the cashless system used at property 5 is different from the cashless system used at property 104.

In 426, the cashless server 100 checks the local cashless instrument transaction database to confirm the request for validation received in 424 is valid. When the transaction is valid (e.g. the cashless instrument was generated at property 104 and has not been previously validated), in 431, an approval message may be sent from the cashless server 100 to the clearinghouse 136, in 432, the clearinghouse may forward or generate the approval message to the cashless sever 10, in 434, the cashless server 10 may forward or generate the approval message to the cashless transaction validation site 400. In 428, the cashless server may cover the debit by allocating or transferring funds to an account used to cover debits. In 430, the cashless server 100 may send an Electronic Fund Transfer (EFT) to cover the debit to the clearinghouse 136. The EFT may be sent after each transfer or may be sent as a batch at the end of some time period, e.g. at the end of each day.

In 436, the validation site 400 at property 5, performs an appropriate operation when the validation is approved. For example, when the validation site 400 is a gaming machine, credits may be posted on the gaming machine. As another example, when the validation site 400 is a cashier station, the player may receive a cash amount according to the value of the cashless instrument.

One advantage of using a cashless system with EFT is that nothing physical has to be exchanged between the properties. When a token is issued as a credit of indicia at one property and then used at a second property, the second property may allow the token to be used as credit of indicia at the second property. However, the tokens must be counted at the second property and then shipped back to the first property and counted so that the second property may receive the amount of money associated with the token. For many properties accepting tokens from many different properties, the infrastructure associated with the counting, sorting and shipping of tokens from one property to another may be quite large. This type of infrastructure may reduced or eliminated using the cashless instrument transaction clearinghouse with EFT between various properties connected to the clearinghouse.

Besides cashless instrument validations for payout, in another embodiment, the cashless validation processes described above using the cashless instrument transaction clearinghouse may be used to run promotions or complimentary promotions across multiple properties. For example, a promotion could be targeted for a specific type of gaming machine or game theme whereby the player would receive a cashless instrument such as a bar coded ticket from the gaming machine during game play. This bar coded ticket could be redeemed at any of the participating properties linked by the cashless instrument transaction clearinghouse. The bar coded ticket may be redeemed for merchandise or game play credit—whichever is defined as the promotion and printed on the ticket. Further, the ticket may be generated by the gaming machine to entice the player to redeem the ticket at a specific property connected to the cashless instrument transaction clearinghouse. As described above, ticket validation is performed at the gaming property to verify that the ticket is a valid promotional or complimentary ticket. Rather then being limited to a single property, the cashless instrument transaction clearinghouse manages the promotions across the properties and maintains a centralized database containing the promotion theme parameters and the statistics once the game has begun.

In another embodiment, the cashless validation processes described above using the cashless instrument transaction clearinghouse may be used to run multiple progressive games associated with the generation or validation cashless instruments at the gaming machine, each of which is managed and controlled by cashless instrument transaction clearinghouse. These new types of progressive games are associated with either the redemption/validation of a cashless instrument or the generation of a cashless instrument upon cashout. At the time a cashless instrument is inserted into a gaming machine for validation by the system, an event gets transmitted to the cashless instrument transaction clearinghouse whereby the player validating the ticket or other cashless instrument has a chance to win a jackpot. A player may also win a jackpot when a cashless instrument is generated. These jackpot events may be incorporated as part of the cashless instrument generation and validation process as described above with reference to FIG. 4 and as described below with reference to FIGS. 5, 6 and 7.

Similar to a lotto game where a sequence of numbers is used to match a central sequence of numbers in an attempt to win the lotto grand prize, the cashless instrument transaction clearinghouse randomly selects a sequence of numbers which is compared to the transaction validation number stored on the cashless instrument. When these two sequence of numbers match, the player wins the central jackpot and is notified of the win at the gaming machine or the cashless transaction validation site where the cashless instrument is being redeemed. Notification to the player may be made in a number of ways including 1) on the gaming machine's video screen 2) by generating a ticket or other cashless instrument at the gaming machine or other cashless transaction validation site indicating the player has won the jackpot.

The jackpot can be funded in many different ways including, but not limited to: 1) a small percentage of each ticket is held by cashless instrument transaction clearinghouse, e.g. 5 cents of each ticket inserted or cashed out is paid to the cashless instrument transaction clearinghouse for a chance to win the progressive jackpot, 2) each property connected to the cashless instrument transaction clearinghouse pays a small amount (cents) into the progressive jackpot each time the player cashes out or redeems a ticket. In addition, the player may have the option at the gaming machine to play for the progressive jackpot upon cashless instrument generation and cashless instrument validation. Thus, the player may chose to commit a small percentage of the cashless instrument towards winning the jackpot which funds the jackpot.

In general, there may be more then one such progressive jackpot managed by the cashless instrument transaction clearinghouse. With multiple progressive jackpots managed by the clearinghouse, each property may have a small progressive for matching a few numbers in addition to a larger progressive across all properties when all numbers on the ticket are matched. The multiple progressive jackpots may provide more chances for a player to win a jackpot. In addition progressive jackpots may encourage the use of cashless instruments by the game player which as mentioned above many operational advantages to the properties using cashless systems.

Figure 5:
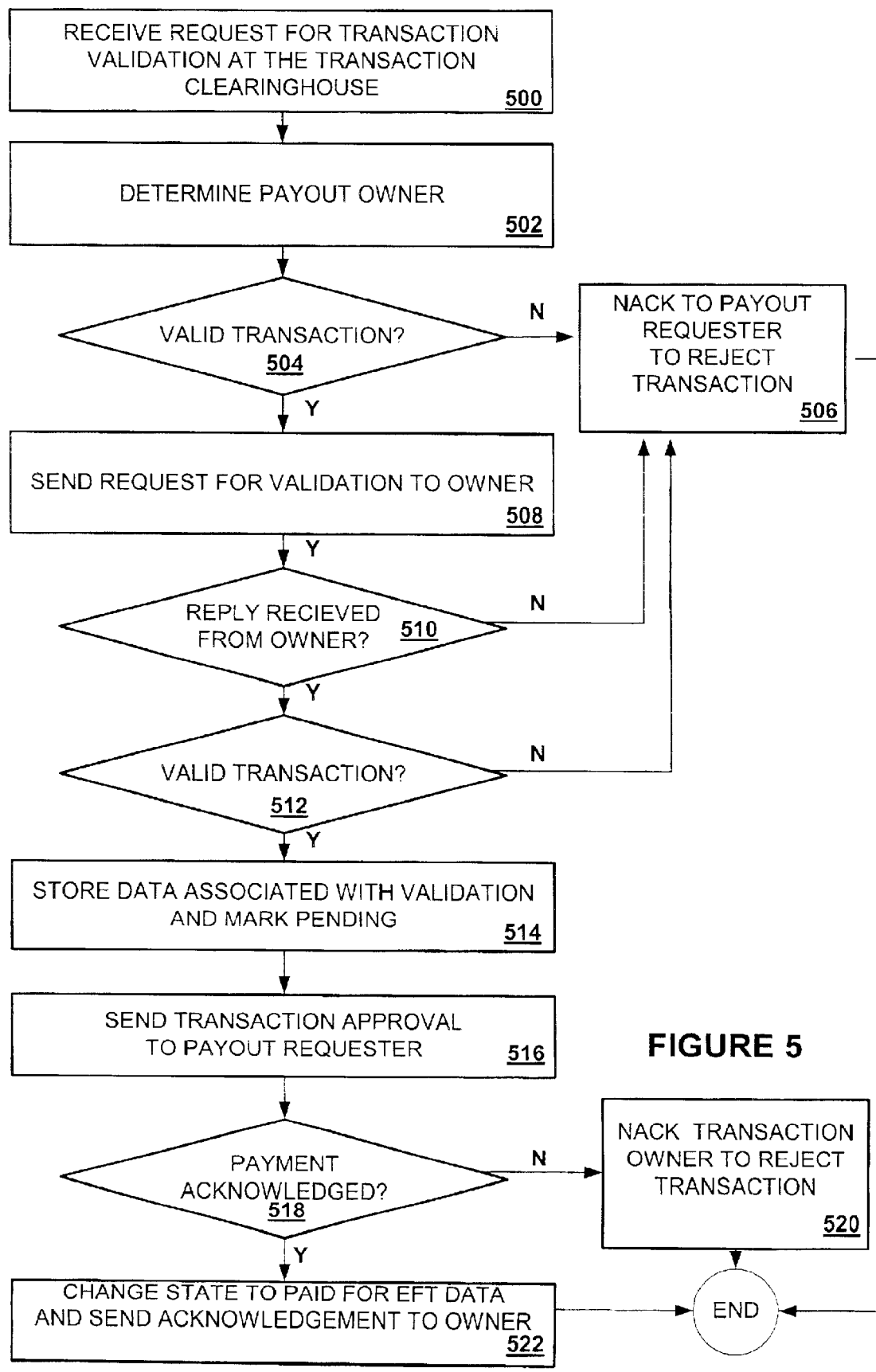
FIG. 5 is a flow chart depicting a method of validating a cashless instrument transaction at a cashless instrument transaction clearinghouse.

FIG. 5 is a flow chart depicting a method of validating a cashless instrument transaction at a cashless instrument transaction clearinghouse. One context of the method of validating the cashless instrument transaction at the cashless instrument transaction clearinghouse is described with respect to FIG. 4. In 500, a request for a cashless instrument transaction validation is received at the clearinghouse 500 from a cashless server. In 502, using information received in the transaction validation request, the clearinghouse determines the transaction owner described in the transaction validation request. In 504, the clearinghouse may determine the validity of the transaction. A transaction may be invalid for a number of reasons including 1) the transaction owner is unknown, 2) the transaction is pending and 3) the transaction has previously been validated. In 506, when the transaction is not valid, a transaction validation reply containing a Non-Acknowledgement (NACK) is sent to the transaction requester of the transaction validation request. The NACK indicates to the transaction requester that the transaction can not be validated at the present time.

In 508, a validation request for the transaction is sent to the cashless server which is the cashless instrument transaction owner determined in 502. In 510, when a validation reply to the validation request is not received by the clearinghouse from the cashless instrument transaction owner, in 506, a transaction validation reply with a NACK is sent to the transaction validation requester. In 512, when a validation reply is received from the cashless instrument transaction owner, the clearinghouse determines whether the validation transaction has been approved or rejected by the cashless instrument transaction owner. A transaction may be rejected for a number of reasons including 1) the cashless instrument has already been validated (e.g. paid), 2) a record of the cashless instrument can not be found and 3) a cashless instrument with transaction information matching the validation request is currently pending. In step 506, when a transaction is rejected, a transaction validation reply with a NACK may be sent to the transaction validation requester.

In 514, when the transaction has been approved by the cashless instrument transaction owner, data associated with the transaction is stored in the clearinghouse database and the transaction is marked pending. While the transaction is pending, the clearinghouse may reject (i.e. 506) validation requests for cashless instruments with transaction information identical to the pending transaction validation request. This operation may be implemented to prevent fraud. In 516, a transaction validation reply with information indicating the requested transaction has been validated is sent from the clearinghouse to transaction validation requester which may be a cashless server. In 518, when the payment of the transaction by the transaction validation requester is not acknowledged in a message of some type, a message containing a NACK may be sent to cashless instrument transaction owner in 520. In 522, when the payment by the transaction validation requester is acknowledged, the state of the transaction is changed from pending to paid and a message may be sent to the owner of the transaction indicating the transaction has been paid. Transaction information stored by the clearinghouse may be used to insure an EFT is made from cashless instrument transaction owner to the cashless instrument transaction validator.

Figure 6:
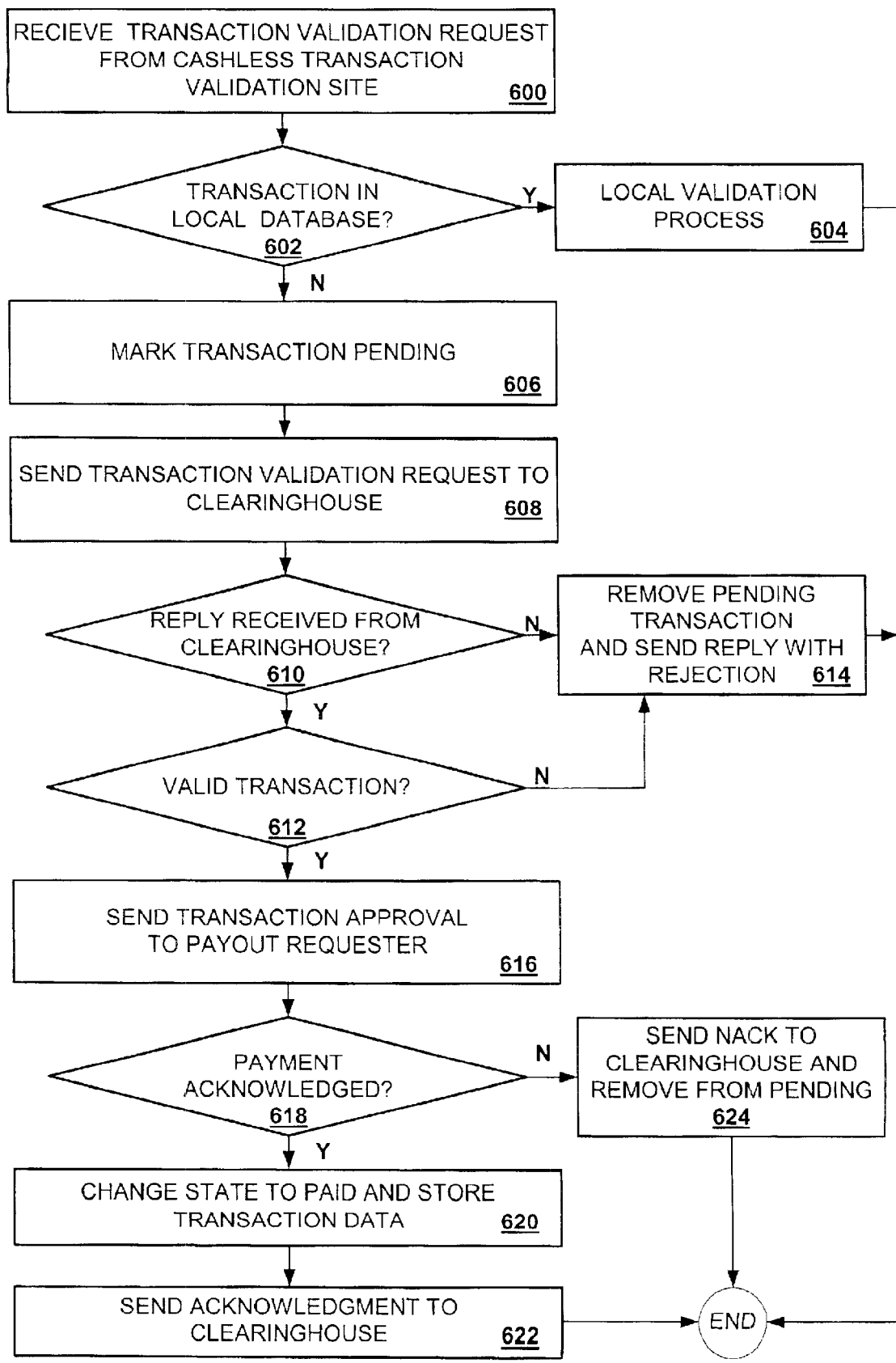
FIG. 6 is a flow chart depicting a method of validating a non-locally owned cashless instrument at a cashless transaction validation site local to the cashless server.

FIG. 6 is a flow chart depicting a method of validating a non-locally owned cashless instrument at a cashless transaction validation site local to the cashless server. One context of the method of validating the non-local cashless instrument transaction at the cashless server is described with respect to FIG. 4. In 600, the cashless server receives a cashless instrument validation request from a cashless transaction validation site. In 602, the cashless server determines the owner of the cashless instrument. When the cashless instrument is locally owned, e.g., the cashless instrument is being validated at the same property where the cashless instrument was generated, a local transaction validation process is used in step 604. One example of a local transaction validation process with respect to a cashless system was described with reference to the EZ pay system in FIG. 1.

In 606, when the cashless instrument transaction owner is non-local, the transaction is marked pending in the cashless server database. In 608, a transaction validation request message containing the cashless instrument transaction information needed to validate the cashless instrument validation request is generated and sent to the cashless instrument transaction clearinghouse. In 610, when a transaction validation reply is not received from the clearinghouse, in 614, the transaction validation request is removed from the queue of pending transaction validation requests, a message containing a transaction rejection is generated and the message rejecting the transaction is sent to the transaction validation site. When a transaction validation reply is received from the clearinghouse, the transaction validation reply typically will contain information regarding whether the requested transaction has been approved or rejected. In 612, when the transaction is rejected, in 614, the transaction validation request is removed from the queue of pending transaction validation requests, a message containing a transaction rejection is generated and the message rejecting the transaction is sent to the transaction validation site.

In 616, when the transaction validation reply approving the transaction validation request is received by the cashless server from the clearinghouse, a transaction approval message may be sent to the cashless transaction validation site that requested the transaction validation in 600. When the execution of the transaction is not acknowledged by the cashless transaction validation site, in 624, the cashless server sends a message to the clearinghouse indicating the transaction has been cancelled and removes the transaction from its queue of pending transactions. In 618, the payment may not be acknowledged for a number of reasons including 1) a communication failure between the cashless transaction validation site and the cashless server, 2) an equipment failure and 3) an operator of the cashless transaction validation site rejects the transaction for some reason. In 620, when the cashless server has received an acknowledgement message from the cashless transaction validation site indicating the cashless instrument transaction has been completed, the state of the transaction is changed from pending to completed (e.g. paid) and information regarding the cashless instrument transaction is stored. In 622, an acknowledgement message indicating the transaction has been completed may be sent to the clearinghouse.

Figure 7:
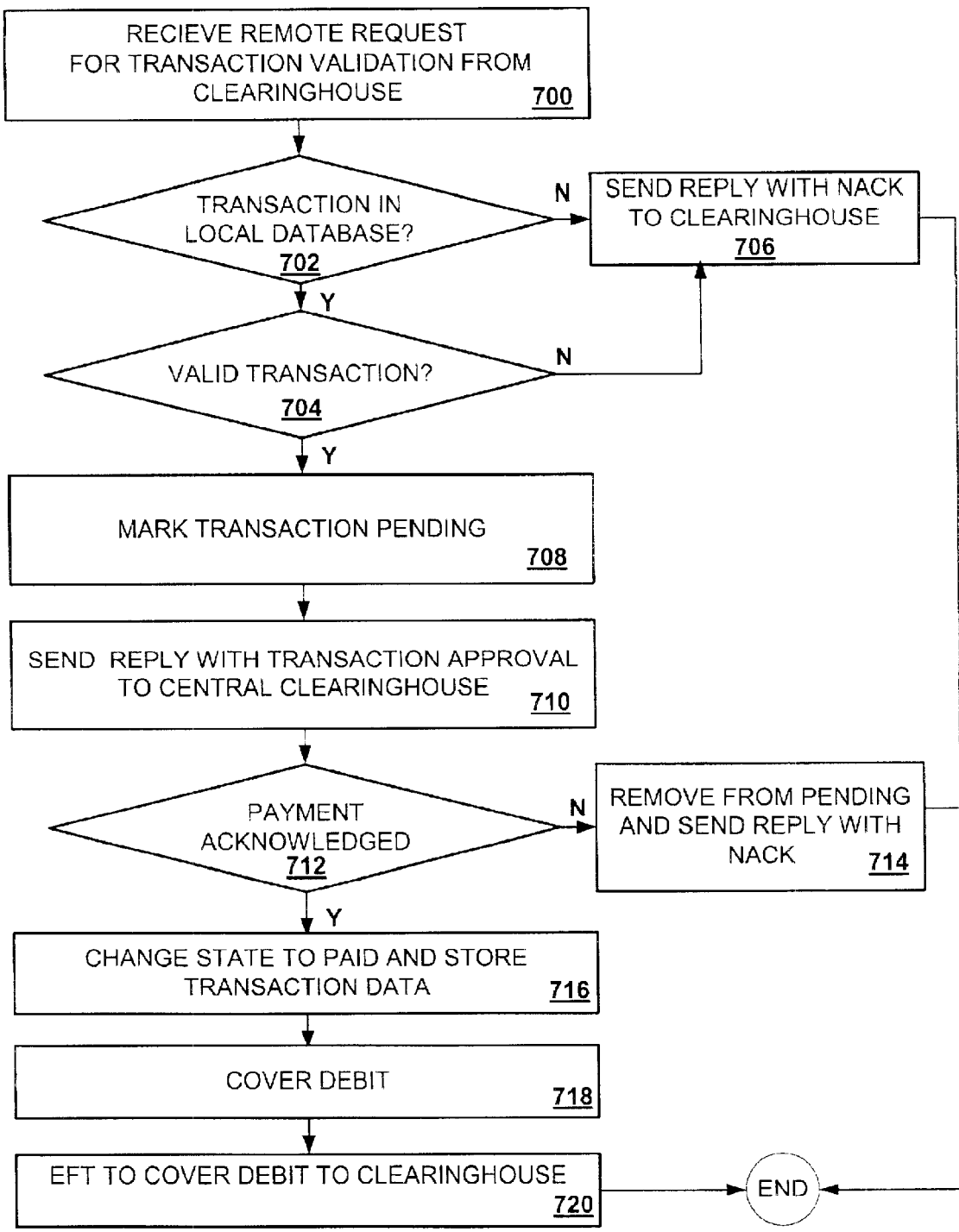
FIG. 7 is a flow chart depicting a method of validating a cashless instrument at a cashless transaction validation site non-local to the cashless server containing a record of the cashless instrument.

FIG. 7 is a flow chart depicting a method of validating a cashless instrument at a cashless transaction validation site non-local to the cashless server containing a record of the cashless instrument. One context of the method of validating a cashless instrument at a cashless transaction validation site non-local to the cashless server containing a record of the cashless instrument is described with respect to FIG. 4. In 700, the cashless server containing the record of the cashless instrument receives a transaction validation request from the cashless instrument transaction clearinghouse. The transaction validation request from the cashless instrument transaction clearinghouse is an information packet that may contain the information needed for the cashless server to validate the transaction.

In 702, using the information contained in the information packet, the cashless server determines whether the transaction has been stored in a database accessible to the cashless server. In 706, when the transaction does not reside in the local database, a non-acknowledgement message indicating the transaction has been rejected is sent to the clearinghouse. In 704, when the transaction resides in the database accessible to the cashless server, the cashless server rejects or approves the transaction. The cashless server may reject a transaction for a number of reasons including 1) the transaction has already been paid and 2) the transaction has been marked pending. When the transaction is rejected, a non-acknowledgement message indicating the transaction has been rejected is sent to the clearinghouse.

In 708, when the transaction has been approved, the cashless server marks the transaction pending in the local database. In 710, the cashless server generates and sends a message to the central clearinghouse where information contained in the message indicates the transaction has been approved. In 712, the cashless server determines whether the payment has been acknowledged. The cashless server may receive an acknowledgement of payment via an acknowledgement message sent by the cashless instrument transaction clearinghouse. Typically, the cashless server may expect an acknowledgement during a fixed period of time. In 714, when the payment of the transaction is not acknowledged by the clearinghouse, the cashless server may remove the pending status of the transaction and send a message to the clearinghouse indicating the transaction is no longer approved.

In 716, when the transaction is approved, the cashless server changes the state of the transaction to paid and stores the transaction data. In 718, as described with reference to FIG. 4, the cashless server covers the debit. In 720, the cashless server may send an EFT to cover the debit, represented by the paid transaction, to the cashless instrument transaction clearinghouse.

Figure 8:
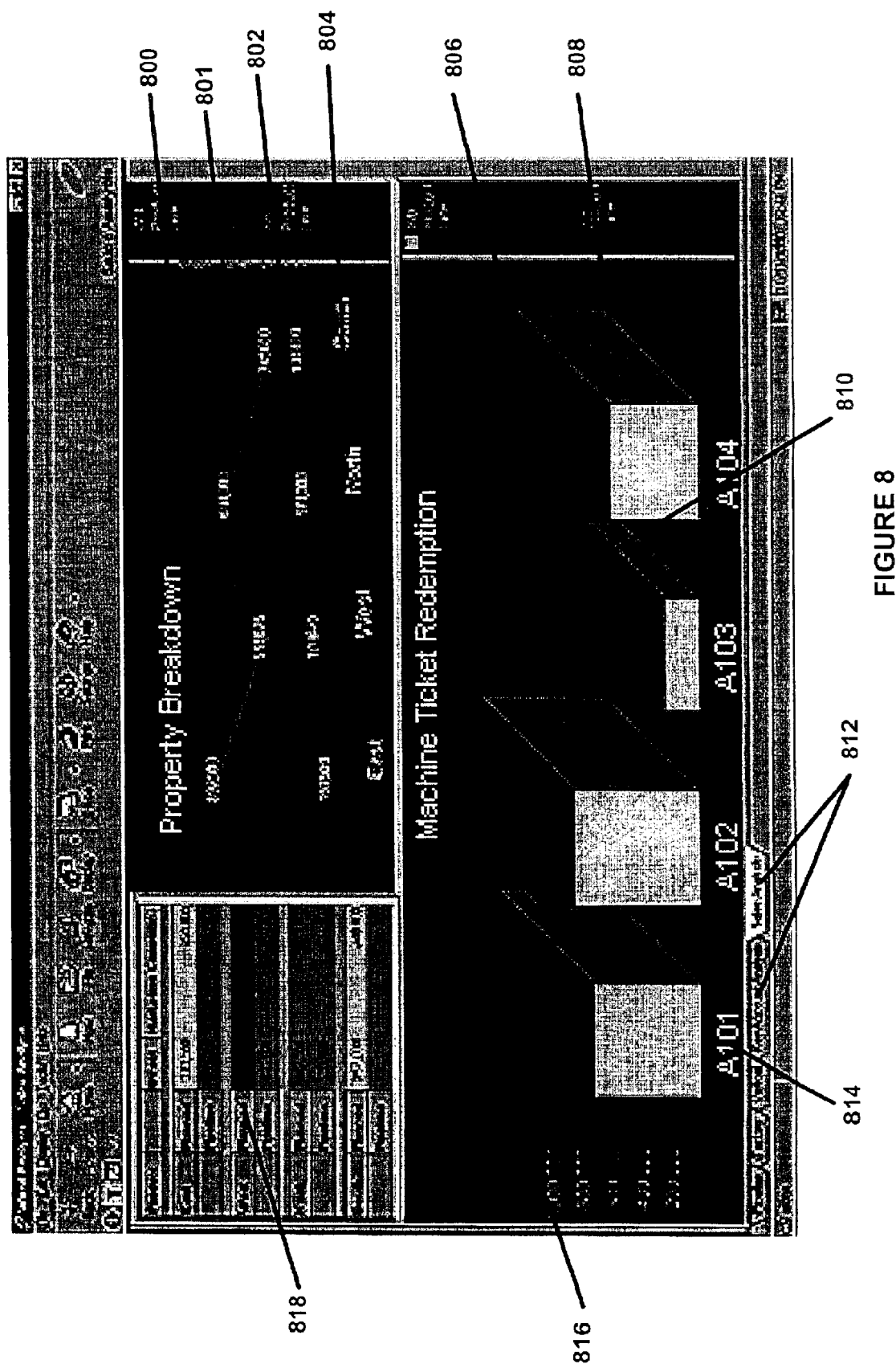
FIG. 8 is a screen shot of a graphical user interface used to analyze cashless instrument transactions in accordance with this invention.

FIG. 8 is a screen shot of a transaction analysis graphical user interface used to analyze cashless instrument transactions that have been processed by a cashless instrument transaction clearinghouse. The transaction analysis graphical user interface (GUI) may provide statistical monitoring for multiple properties connected to the cashless instrument central clearinghouse. With transaction analysis GUI, a user may be able to tract many types of transactions passing through the clearinghouse including 1) transactions relating bar-coded tickets, debit cards and smart cards for cashouts and 2) transactions relating to on-going promotions and compensations (comps) distributed to players. The screen shot is divided into three graphical windows 800, 810 and 818. Each window may contain different visual presentations of data including but not limited to 1) tickets generated, 2) tickets redeemed, 3) flow of tickets from generation to redemption, 4) length of time a ticket is held by a customer, 5) comparison between properties of all ticket statistical data, 6) tickets generated over time by machine, and 7)

tickets redeemed overt time by machine (e.g. gaming machine, cashier station, etc.)

In window 800, a breakdown of ticket data for two product lines, including 801 and 802, is plotted for four different properties 804 named North, South, East and West. As mentioned above, access to this information may be limited according to ownership of the properties. In window 818, the numerical values of the data for each property that are graphed in window 800 are displayed as raw data. In window 810, the amount of cashless redemption's for four different gaming machines, including 814, are plotted. The cashless redemption's are broken down according to two different product lines 806 and 808. The values of these product lines were plotted according to property in window 800.

The type of data displayed, the format of the data displayed and the format of the transaction analysis GUI may be easily changed by using the pull downs menus 812 to alternate between graphical displays. In general, all of the statistical information is displayed as raw data, as two dimensional graphs and as three dimensional contour types of graphs representative of ticket transactions or game play. Basic features utilized in the graphical presentation include: titles, X and Y axes scales, data point plotting, shading, horizontal and vertical grid lines, informational messages and data line differentiation.

An advantage of providing a multidimensional view of providing a multidimensional view of multiple property ticket, machine and player related data is that it provides a solid foundation for analytical processing through flexible access to the information of interest to an entertainment corporation operating a number of properties. Operators can visually analyze data across any dimension, at many levels of aggregation, with equal functionality and easy access. The graphical tools provided by the cashless instrument transaction clearinghouse provide views of data in a natural and responsive fashion which is intended to insulate users from complex database query syntax.

In the present invention, methods are described for authenticating and protecting cashless transaction information sent between a cashless gaming device at a gaming property and a cashless instrument transaction clearinghouse. In general, authentication methods are used by a receiver of a communication of a message to validate an identity of a sender of message. For cashless transactions that may involve that electronic transfer of funds, authentication is important for preventing fraud and theft. The protection methods, which typically involve encryption of the cashless transaction information, are also used for preventing fraud and theft.

In particular embodiments of the present invention, security architectures are used that provide methods of authenticating a message sender and protecting cashless transaction information in a message via encryption. The security architectures may employ both asymmetric and symmetric encryption techniques. The security architectures in the present invention are described for illustrative purposes only and the present invention is not limited to only the encryption schemes described herein. For instance, in the present invention, asymmetric and symmetric encryption schemes are both used. In some embodiments of the present invention, only asymmetric or only symmetric encryption may be used. As another example, a combination of encryption schemes, in a security architecture, are used to authenticate the message sender. In other embodiments of the present invention, other combinations of encryption schemes and additional/different authentication techniques (ANY QUICK EXAMPLES YOU CAN THINK OF?) may be used to validate an identity of a message sender.

As described above, the encryption architectures may employ asymmetric and symmetric encryption techniques. In symmetric encryption, two parties share a common encryption key that is used to encrypt to encrypt and to decrypt information. To maintain security, the symmetric key must remain a secret shared only be the two parties using the key.

In an asymmetric encryption scheme, a public-private encryption key pair is generated. Information encrypted with the private encryption key may be decrypted only using the corresponding public encryption key of the public-private encryption key pair and information encrypted with the public encryption key may be decrypted only using the private encryption key of the public-private encryption key pair. Thus, an entity with a private encryption key of public-private encryption key pair may give its public encryption key to many other entities. The public key may be made available (via an Internet server, e-mail, or some other means) to whoever needs or wants it. The private key, on the other hand, is kept secret. Only the owner of the key pair is allowed to possess the private key. The other entities may use the public encryption key to encrypt data. However, as long as the private encryption key remains private, only the entity with the private encryption key can decrypt information encrypted with the public encryption key.

A private key of a public-private key pair may also be used to sign a message. The signature may be used for authenticating the message. When the private key is used to sign a message, then the public key must be used to validate the signature. For example, to send someone a digitally signed message, the message is signed with a private key, and the receiver of the message may verify the signature by using the public key corresponding to the private key.

In general, public-key algorithms are very slow and it is impractical to use them to encrypt large amounts of data. In practice, symmetric algorithms are used for encryption/decryption of large amounts of data, while the public-key algorithms are used merely to encrypt the symmetric keys. Similarly, it is not usually practical to use public-key signature algorithms to sign large messages. Instead, a hash may be made of the message and the hash value may be signed.

Figure 9:
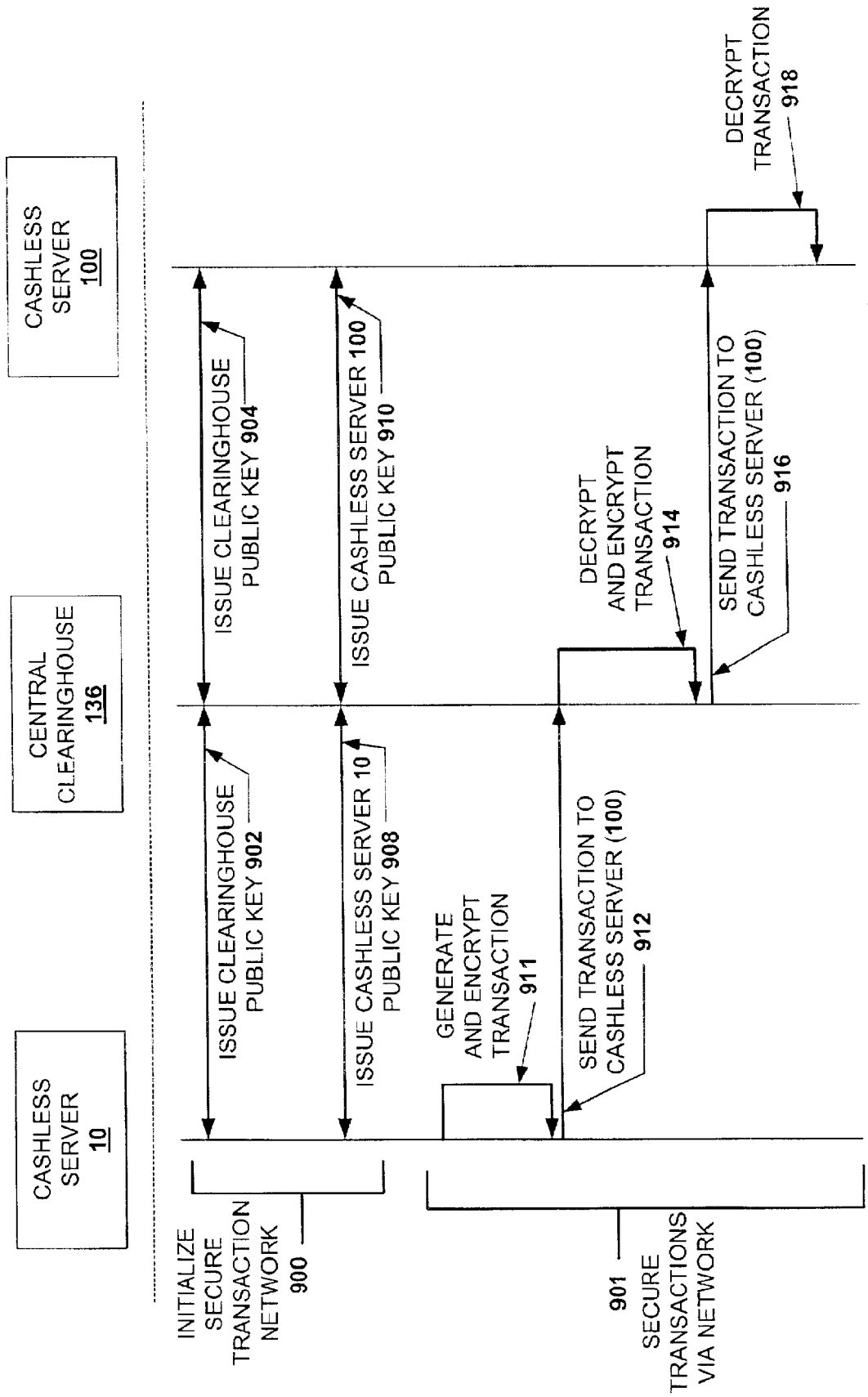
FIG. 9 is an interaction diagram depicting a method of generating secure communications between a cashless instrument clearinghouse and one or more cashless gaming devices.

FIG. 9 is an interaction diagram depicting a method of generating secure communications between a cashless instrument clearinghouse 136 and one or more cashless gaming devices (e.g. cashless server 10 and cashless server 100) for one security architecture of the present invention. In 900, a secure transaction network is initialized. The initialization of the secure transaction network may involve the exchanging of encryption keys between the cashless instrument transaction clearinghouse 136 and a plurality of cashless gaming devices, such as cashless server 10 and cashless server 100, located at different gaming properties that process cashless gaming transactions.

As an example of initializing a secure cashless instrument transaction network, in 902 and 904, the clearinghouse issues a clearinghouse public encryption key to each of the cashless servers 10 and 100. The public key is stored on the servers and may be used to encrypt information. Details of this method are described with respect to FIG. 10. This method may be repeated for a plurality of cashless gaming devices, such as gaming machines, cashless servers, clerk validation terminals and hand-held computing devices, that may be used to process cashless instrument transactions. In 908 and 910, gaming devices that communicate encrypted information with the clearinghouse 136 may each issue a cashless gaming device public encryption key of a public-private encryption key pair to the clearinghouse 136. Details of this method are described with respect to FIG. 11. The public keys may be stored in a memory device on the clearinghouse and may be used to encrypt information sent from the clearinghouse 136 to the cashless gaming devices such as the cashless server 10 and the cashless server 100.

In 901, the encryption keys may be used to allow secure transaction via a network connecting the cashless gaming devices, such as the cashless servers, and the clearinghouse 136. The network connecting the cashless gaming devices and the clearinghouse 136 may be a local area network, a wide area network, a private intranet, the Internet and combinations thereof. Additional details of the network topology are described in co-pending U.S. application Ser. No. 09/732,650, filed Dec. 7, 2000, by Nguyen, entitled "Secured Virtual Network in a Gaming Machine," which is incorporated herein in its entirety and for all purposes.

As described above, a cashless gaming device at a first gaming property may communicate via the clearinghouse 136 with a second gaming property to validate at the first property a cashless instrument generated at the second property. Using the security architecture of the present invention to perform this cashless transaction, in 911, a cashless gaming device at the first property, such as the cashless server 10, may generate and encrypt a transaction message addressed to a cashless gaming device, such as 100, at the second property. In 912, the encrypted message may be sent to the clearinghouse 136. In 914, the clearinghouse 914 may decrypt and encrypt the transaction message and operate on the transaction information in the message or the clearinghouse 136 may simply route the message to its address. In 916, the clearinghouse sends the transaction to its address which is the cashless server 100. In 918, the cashless server receives the transaction message and decrypts it. Later, the cashless server 100 may reply to the message. Details of the security architecture used for the encryption and decryption are described with respect to FIGS. 12A and 12B.

In FIGS. 10, 11, 12A and 12B, methods, separate from the security architecture may be used to guarantee data integrity within the message as a result of transmission errors. For example, a common algorithm is a CRC-32 hash. When a TCP/IP protocol is used to transmit information, data integrity is built into the TCP/IP protocol. The present invention may be used with a TCP/IP or other common communication protocols. General details of the TCP/IP protocol and methods for providing data integrity are described in the texts "Mobile IP Unplugged" by J. Solomon, Prentice Hall and the text "Computer Networks", A. S. Tanenbaum, Prentice Hall. Both of these references are incorporated herein by reference in their entireties and for all purposes.

In one embodiment of the present invention, a security architecture is developed such that all participants that communicate with the clearinghouse know the correct public key for the clearinghouse server and all communications are routed through the clearinghouse server. Several security attacks are possible when any single participant use a "rogue's" public key. A rogue may be an entity pretending to be the clearinghouse. Therefore, the distribution of the clearinghouse's public key may be done using a certain amount of manual intervention.

The manual intervention may include distribution of the public key using a voice telephone conversation, a fax message, the physical delivery of a floppy (or other removable) disk, use of a password-protected website, using a certificate server of some kind, etc. In most cases, a human being may be overseeing the distribution of the correct public key to the participants such as when a voice telephone conversation is used. Once it is established that a participant has the correct clearinghouse public key, automated communications may begin. The participant, which may be a cashless gaming device can generate its own public-private key pair. Using the clearinghouse's public key, the participant may send the clearinghouse its new public key. The clearinghouse will store this key and all further communications with that participant will use that key. While the key sent to the clearinghouse is not considered "private" per se, it will not be distributed to all of the other participants. This will assure that all transactions must be routed through the clearinghouse in order to be considered authentic.

Figure 10:
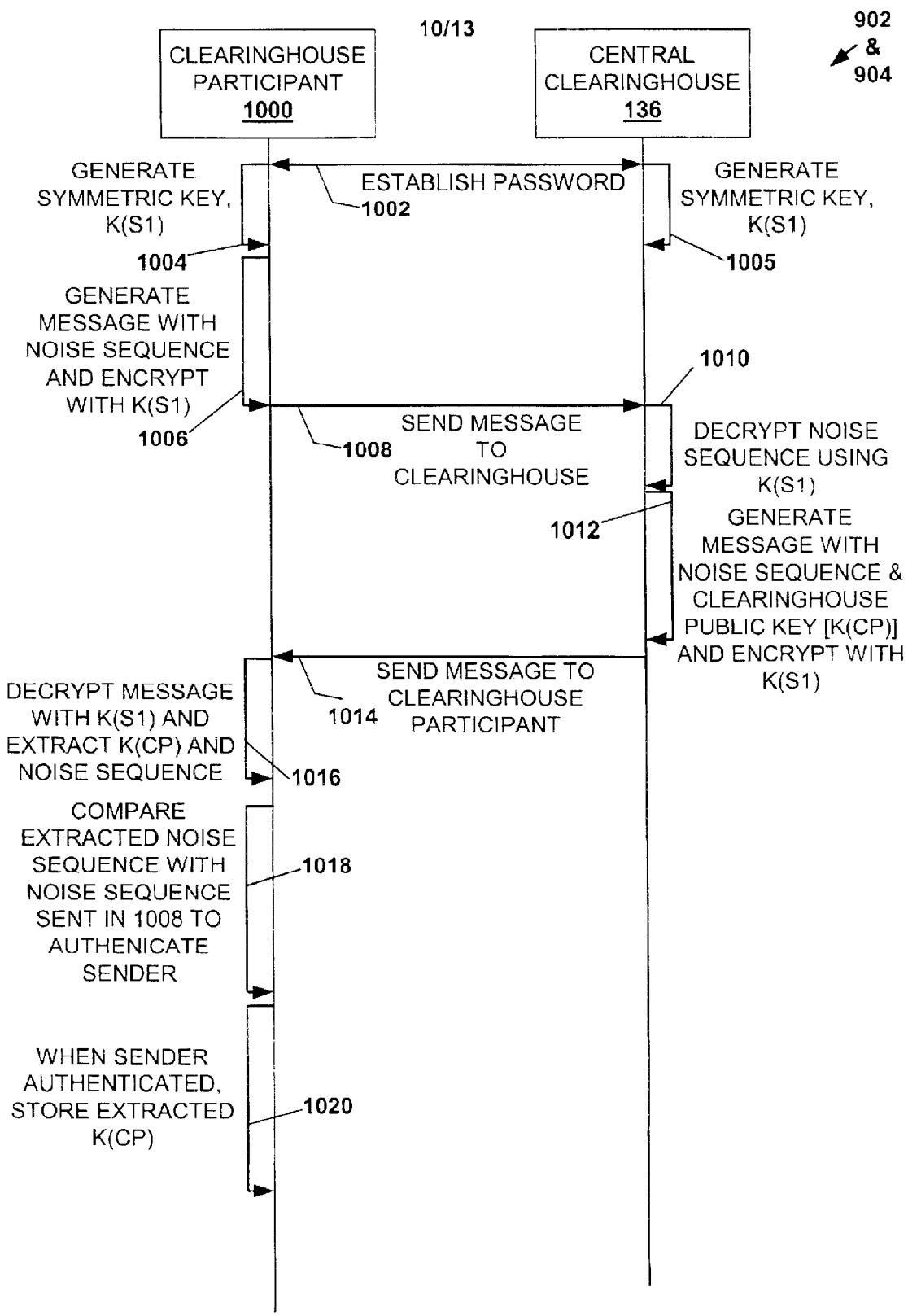
FIG. 10 is an interaction diagram depicting a method of issuing a clearinghouse public encryption key in a public-private encryption key pair to a cashless gaming device at a gaming property.

FIG. 10 is an interaction diagram depicting a method of issuing a clearinghouse public encryption key in a public-private encryption key pair to a cashless gaming device at a gaming property. For a variety of reasons, it is important for the clearinghouse participant 1000, which may be a cashless gaming device located at a gaming property, to ensure that the clearinghouse public key is authentic. Many of these reasons pertain to assuring that a rogue clearinghouse clone is not intercepting and processing ticket transactions for the participant 1000. Without authentic knowledge of the issuer of the clearinghouse's public key, the participant 1000 may be sending cashless transactions to the rogue, who may in return be sending approvals of cashless transaction where there should be denials. For instance, a rogue may approve a cashless transaction for a cashless instrument which has previously been validated.

In one method (e.g., 1002), the authentication may be accomplished with the use of a shared password. The shared password is agreed upon by the administrators of both the participant 1000 and the clearinghouse 136. The administrators may select and/or agree upon a password using a voice telephone, a fax, or some other means of communication. In 1004 and 1005, cashless gaming devices at the participant 1000 and the clearinghouse 136 use this password as a "seed" to generate an identical symmetric password, K(S1). For instance, a symmetric encryption key may be generated by applying a hashing algorithm to the seed, such as SHA and MD5 to generate a seemingly random set of bits. Other methods may be used to generate the random bit set. The random bit set may be used with an algorithm of some type to encrypt a data set.

In 1006, the participant's system generates a message with an information sequence encrypted with the symmetric password, K(S1). The information sequence may be a randomly generated noise sequence. In 1008, the participant's system sends a request message for the clearinghouse public key that has been encrypted using this symmetric password and the encrypted noise sequence.

In 1010 and 1012, the clearinghouse 136 receives the message from the participant 1000 and responds with the clearinghouse public key encrypted with the symmetric encryption key generated in 1005. In 1010, the clearinghouse 136 decrypts the information sequence and other information contained in the message using the symmetric encryption key generated in 1005. In 1012, the clearinghouse 136 encrypts the clearinghouse public key and the decrypted noise sequence sent in message 1008 with the symmetric key, K(S1), generated in 1005. In 1014, the clearinghouse 136 sends the message with encrypted information to the participant 1000.

In 1016, the participant 1000 receives the message from the clearinghouse and decrypts the message using the symmetric encryption key generated in 1004. The clearinghouse public key and the information sequence in the message are extracted in the decryption process. If the symmetric encryption keys generated in 1004 and 1005 are the same, then the information sequence generated in 1006 should be the same as the information sequence extracted in 1016. However, if the symmetric keys generated in 1004 and 1005 are different, then the information sequence generated in 1006 and extracted in 1016 should be different. Thus, in 1018, when the Participant receives the response correctly i.e. the information sequence generated in 1006 is identical to the information sequence extracted in 1016, it knows that the public key for the Clearinghouse is authentic. Once this request-response action is completed, in 1020, the clearinghouse public key is stored and the password is invalidated and thrown away. The method in FIG. 10 may be repeated for each participant in communication with the clearinghouse.

Figure 11:
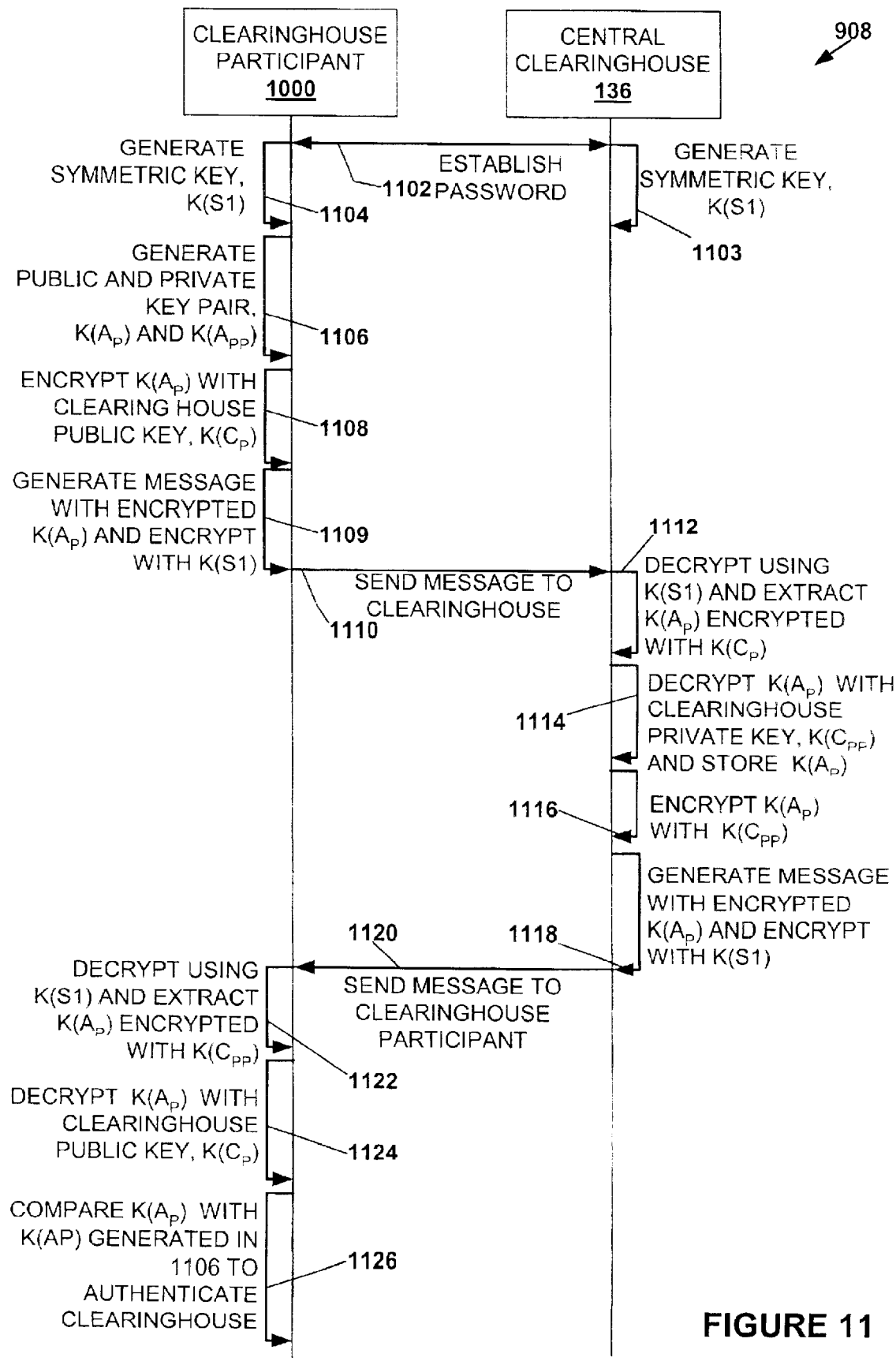
FIG. 11 is an interaction diagram depicting a method of issuing a cashless gaming device public encryption key in a public-private encryption key pair to a cashless instrument transaction clearinghouse.

FIG. 11 is an interaction diagram depicting a method of issuing a cashless gaming device public encryption key in a public-private encryption key pair from a cashless gaming device at a clearinghouse participant 1000 to a cashless instrument transaction clearinghouse 136. FIG. 11 describes a method used to update the clearinghouse 136 with a participant's 1000 new public key. For the same reasons, it is important for the participant to know it has an authenticated clearinghouse public key (e.g., security from rogues as described with respect to FIG. 10), it is important for the clearinghouse 136 to know it has an authentic participant's public key. This may prevent a rogue participant clone from introducing cashless transactions that are not authenticated.

As with the scheme outlined in FIG. 10 (above), the use of a shared password may be used to assure that the "real" Participant 1000 is sending its public encryption key. In 1102, the password may be agreed upon by the administrators of both the Participant and the Clearinghouse. These people will select and/or agree upon a password using a voice telephone, a fax, or some other means of communication. Then, in 1103 and 1104, the clearinghouse 136 and the participant will "seed" their systems, i.e. cashless gaming devices, with the password to generate a symmetric encryption key 1106.

In 1106, the cashless gaming device at the participant 1000 generates a public-private encryption key pair, $K(A_p)$ and $K(A_{pp})$. In 1108, the cashless gaming device encrypts its public key, $K(A_p)$ with the clearinghouse public key, $K(C_p)$ to generate $K(C_p)[K(A_p)]$ (i.e., the participant public key encrypted with the clearinghouse public key). In 1109, the cashless gaming device encrypts $K(C_p)[K(A_p)]$ with the symmetric encryption key, $K(S1)$ to generate, $K(S1)[K(C_p)[K(A_p)]]$ (i.e., the participant public key encrypted with the clearinghouse public key and encrypted again with the symmetric key) which is incorporated in a message. In 1110, the message with $K(S1)[K(C_p)[K(A_p)]]$ is sent from the participant 1000 to the clearinghouse.

In 1112, the clearinghouse 136 receives the message from the participant and decrypts the message with the symmetric encryption generated in 1103 using the password exchanged with the participant. In 1114, the clearinghouse decrypts the message again with the clearinghouse private encryption key, $K(C_{pp})$ (which corresponds to the clearinghouse public encryption key exchanged by the method described in FIG. 10), to extract the participant public encryption key, $K(A_p)$. The clearinghouse 136 checks that the correct password and public encryption key has been used. In one embodiment, a key-header may be included with the participant public encryption key, $K(A_p)$. The header may consist of information about the key such as what algorithm was used to generate the key, a length of the key and a CRC of the key itself. If an incorrect password is used by one side or both to generate $K(S1)$, then the key-header will be incomprehensible to the clearinghouse 136 and a CRC of the encryption key performed by the clearinghouse will not match the CRC of the key sent in the key-header. When the correct password and public has been used, a CRC of the key will match a CRC sent in the key-header and the clearinghouse 136 stores the participant public encryption key for use in future communications with the participant.

In 1116 and 1118, the clearinghouse 136 may respond with an acknowledgement message. In one embodiment of an acknowledgement message, the participant public encryption key, $K(A_p)$, may be encrypted with the clearinghouse private encryption key, $K(C_{pp})$. In 1118, $K(A_p)$ may be encrypted again with the symmetric key, $K(S1)$, generated in 1103. The doubly encrypted, $K(A_p)$, may be included in a message generated by the clearinghouse 136. In 1120, the message is sent from the clearinghouse 136 to the participant 1000.

In 1122, the participant 1000 receives the message from the clearinghouse and decrypts the message with the symmetric encryption key, $K(S1)$, generated in 1104. In 1124, the message is decrypted again with the clearinghouse public key, $K(C_{pp})$, to extract a participant public encryption key, $K(A_p)$ sent by the clearinghouse 136. In 1126, the extracted participant public encryption key is compared with the participant public encryption key, $K(A_p)$, sent to the clearinghouse 136 in 1109 and generated in 1106, to authenticate the sender of the acknowledgement message is the clearinghouse 136.

In this example, if the participant 1000 receives the acknowledgement correctly, it is assured that the clearinghouse 136 now knows its public encryption key, $K(A_p)$. The Clearinghouse 136 also knows that the public encryption key of the participant 1000 was authentic. Once this request-response action is completed, the password exchanged in 1102 is invalidated and thrown away. The method, described above, may repeated with a plurality of participants (e.g., cashless gaming devices and their administrators) located at different gaming properties that communicate with the clearinghouse. Further, more than one participant may be located at each gaming property.

In FIGS. 10 and 11, a password exchanged between the clearinghouse and the participant may only be used for only a single public encryption key exchange. Thus, if a hacker were to deduce the password from watching traffic, it would then be worthless to him. If the password were re-used, the hacker may have the ability to inject traffic into the conversations between that participant 1000 and the clearinghouse 136, or to intercept traffic and replace it. Thus, the password is used primarily to authenticate the data being passed back and forth. It is not necessarily used for privacy. This is acceptable because only public keys are being communicated. By their very nature, these keys are not considered "secrets".

In typical authentication schemes used today, the use of a "Certificate Authority" guarantees the authenticity of a public key (along with other certificate information). However, using such a scheme requires extreme physical security measures be in place to guard the private key. This is extremely costly. Therefore, the methods described in FIGS. 10 and 11 allow a compromised private key to be changed without costing significantly in terms of dollars or manpower. For instance, when a private key is comprised for a participant in communication with the clearinghouse, the participant generates a new public-private encryption key pair and exchanges it with the clearinghouse as described with respect to FIG. 11. However, other unaffected participants may not be required to change their encryption keys to continue communications with the clearinghouse. Thus, only a portion of the transaction network is reinitialized and the rest of transaction network may be unaffected.

Figure 12A:
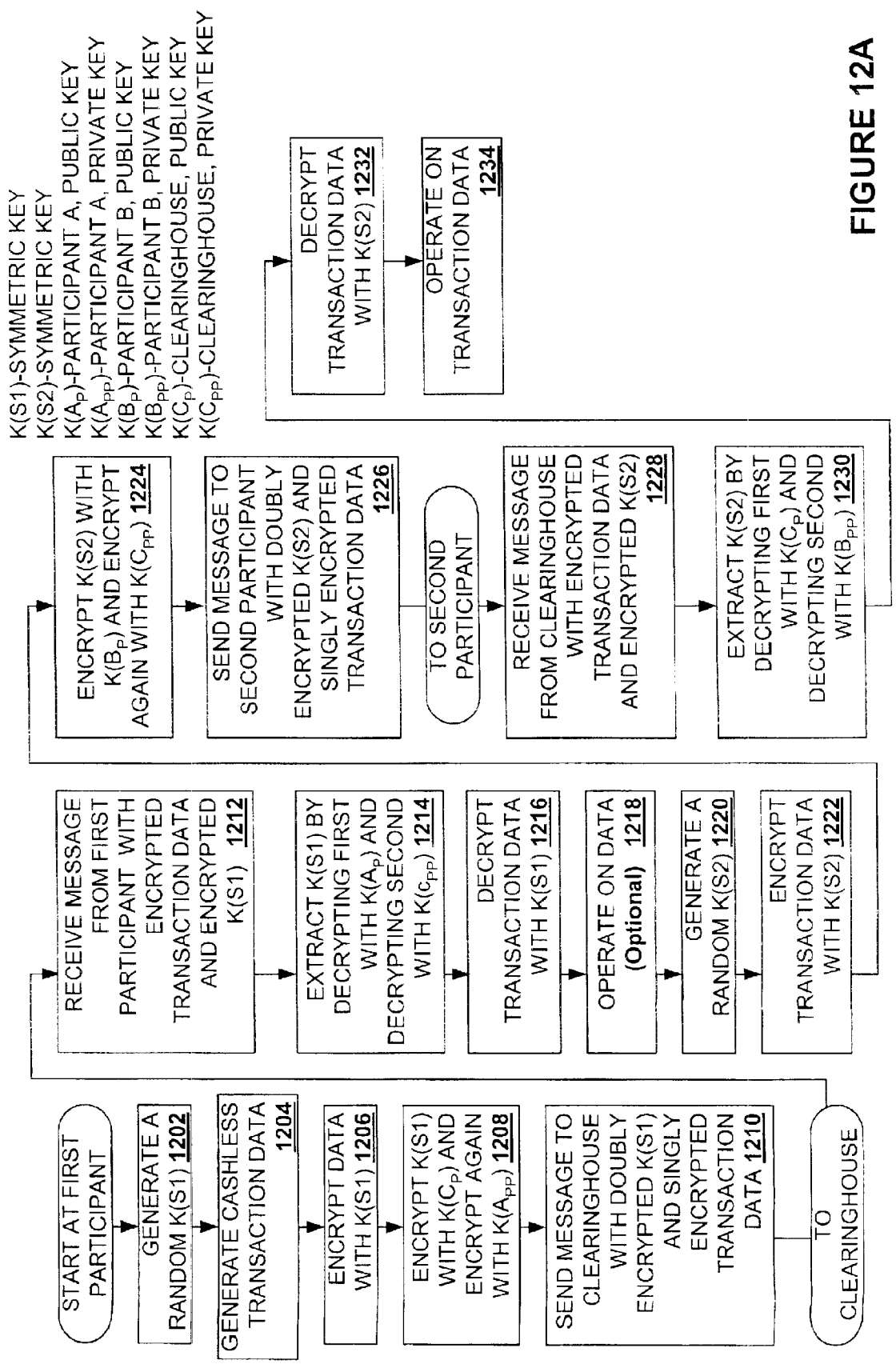
FIGS. 12A and 12B is a flow chart depicting methods of generating encrypted and authenticated communications between gaming properties in a cashless instrument transaction network using a cashless instrument transaction clearinghouse.
Figure 12B:
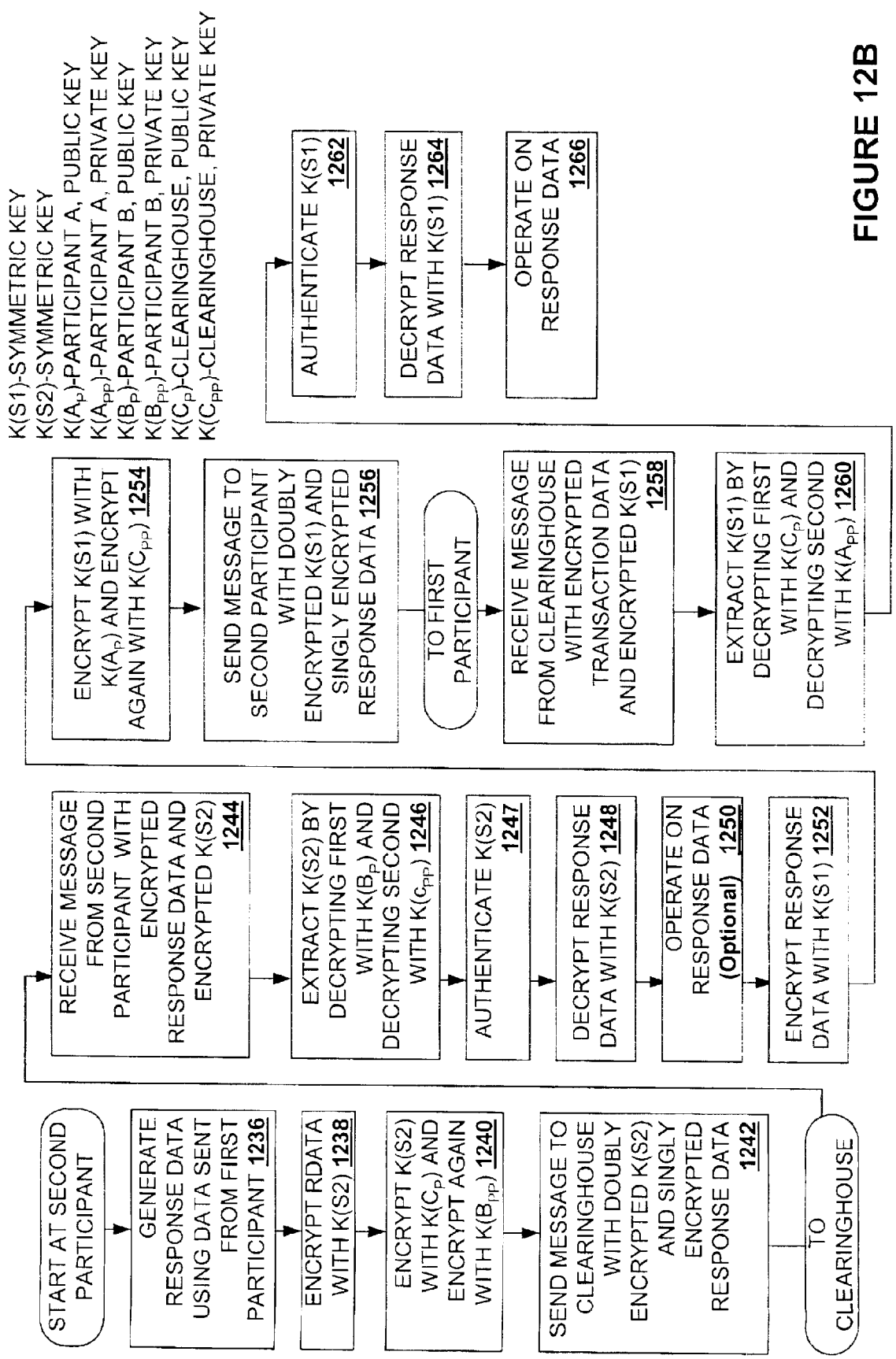

FIGS. 12A and 12B is a flow chart depicting methods of generating encrypted and authenticated communications between gaming properties in a cashless instrument transaction network using a cashless instrument transaction clearinghouse. For illustrative purposes only, FIGS. 12A and 12B describes the communications between the clearinghouse and two participants each located a separate gaming property. As described above, the clearinghouse may communicate with a plurality of participants. The intent of the described communications is for first participant (A) to "request" some action from a second participant (B). For instance, a cashless gaming device located at the gaming property of the first participant may wish to validate a cashless instrument issued from a cashless gaming device located at the gaming property of second participant. In this example, the "request" from the first participant is met with a "response" from the second participant. Not all messages sent from one participant to another via the clearinghouse may require a response.

A number of encryption keys are used in the example described in FIGS. 12A and 12B. The encryption keys include: 1) K(S1), a symmetric encryption key generated by the first participant, 2) K(S2), a symmetric encryption key generated by the clearinghouse, 3) $K(A_p)$ and $K(A_{pp})$, a public-private encryption key pair generated by the first participant, 4) $K(B_p)$ and $K(B_{pp})$, a public-private encryption key pair generated by the second participant and 5) $K(C_p)$ and $K(C_{pp})$, a public-private encryption key pair generated by the clearinghouse. The example assumes that the clearinghouse has exchanged public encryption keys with each of the participants. The public encryption keys may have been exchanged using the methods described with respect to FIGS. 10 and 11 or using an alternate method. For example, an alternate method of exchanging keys may be for a trusted person or group to hand deliver the public encryption keys from the clearinghouse to each of the participants and from each of the participants to the clearinghouse.

In 1202, the first participant initiates a request to a second participant by generating a random symmetric encryption key, K(S1). In 1204, the first participant generates the cashless transaction information that is incorporated in the request message. The cashless transaction information may comprise information needed by the second participant to perform the requested operation, information used for book keeping or auditing purposes and information such as an address of the message (i.e., the address of the second participant). In 1206, the cashless transaction information is encrypted with K(S1). In 1208, K(S1) is encrypted with the clearinghouse public encryption key, $K(C_p)$ and the participant private encryption, $K(A_{pp})$. The order of the double encryption is not important as long as the receiver knows the order in which to decrypt the information. In 1210, the first participant generates a request message with the encrypted cashless transaction information and the encrypted symmetric encryption key and sends it to the clearinghouse.

In 1212, the clearinghouse receives the request message from the first participant. In 1214, the clearinghouse extracts K(S1) by decrypting with the first participant public encryption key, $K(A_p)$, and by decrypting with the clearinghouse private key, $K(C_{pp})$. In 1216, the clearinghouse decrypts the cashless transaction information in the request message using K(S1). The clearinghouse may store K(S1) for later communications with the first participant. For instance, a reply to the request message.

In 1218, the clearinghouse may optionally operate on the cashless transaction information. For instance, the clearinghouse may store a portion of the information. As another example, the clearinghouse may determine the address of the message (i.e., the second participant) and translate the information into a format used by the second participant. This service may be provided when the cashless systems used by the first participant and the second participant are different and communicate using different communication protocols.

In 1220, the clearinghouse generates a random symmetric encryption key, K(S2). In 1222, the cashless transaction information is encrypted with K(S2). In 1224, K(S2) is encrypted with second participant public encryption key, $K(B_p)$, and again with the clearinghouse private encryption key, $K(C_{pp})$. In 1226, the clearinghouse generates a message with the encrypted symmetric encryption key and the encrypted cashless transaction information and sends it the second participant. To send the message, the clearinghouse may look up and address, such as an IP address, for the second participant.

In 1228, the second participant receives the request message from the clearinghouse. In 1230, the second participant extracts K(S2) by decrypting with the clearinghouse public encryption key, $K(C_p)$ and decrypting with the second participant public key, $K(B_{pp})$. In 1232, the second participant decrypts the cashless transaction information in the request message with K(S2). In 1234, the second participant may use the cashless transaction information in the message to generate an appropriate response to the request message. For instance, in the case of cashless instrument validation request, the second participant may look up and operate on cashless transaction information for a cashless instrument being validated.

In 1236, the second participant may generate additional cashless transaction information for a response message. For instance, the second participant may approve a validation request. In 1238, the second participant may encrypt the cashless transaction information for the response message using K(S2). In 1240, the second participant may encrypt K(S2) with the clearinghouse public encryption key, $K(C_p)$ and encrypt it again with the participant private encryption key, $K(B_{pp})$. In 1242, the second participant may generate a response message with the encrypted symmetric encryption key and the encrypted cashless transaction information and send it to the clearinghouse.

In 1244, the clearinghouse receives the response message from the second participant. In 1246, the clearinghouse decrypts the symmetric encryption key using the second participant public encryption key, $K(B_p)$ and the clearinghouse private encryption key, $K(C_{pp})$. In 1247, the message from the second participant is authenticated by comparing the extracted symmetric encryption key with the symmetric encryption key sent to the second participant in the original message (see 1220). When the keys are identical, it is assumed that the second participant sent the message. Other information besides the second symmetric key may be compared for authentication purposes. For instance, the clearinghouse may have sent a random noise sequence with the request message which may be sent back in the response message and compared for authentication purposes.

In 1248, the clearinghouse decrypts the cashless transaction information in the response message with K(S2). In 1250, the clearinghouse may operate on cashless transaction information or perform operations in response to the cashless transaction information such as translating the information from one format to another format. In 1252, the clearinghouse encrypts the cashless transaction information with the symmetric key, K(S1), received from the first participant in the request message. In 1254, the clearinghouse encrypts K(S1) with the first participant public encryption key, $K(A_p)$ and again with the clearinghouse private encryption key, $K(C_{pp})$. In 1256, the clearinghouse may generate a response message with the encrypted symmetric encryption key and the encrypted cashless transaction information and send it to the first participant.

In 1258, the first participant receives the response message from the second participant sent via the clearinghouse. In 1260, the first participant extracts the symmetric encryption key, K(S1), by decrypting with the clearinghouse public encryption key, $K(C_p)$ and the first participant private encryption key, $K(A_{pp})$. In 1262, the message from the second participant is authenticated by comparing the extracted symmetric encryption key with the symmetric encryption key sent to the clearinghouse in the request message (see 1202). When the keys are identical, it is assumed that the clearinghouse sent the message.

In 1264, the first participant decrypts the cashless transaction information in the message with K(S1). In 1266, the first participant may operate on the cashless transaction information and/or perform an operation in response to the information. For instance, the first participant may validate a cashless instrument.

Multiple transactions, or a transaction that requires multiple requests and responses, are all modeled on top of the simple "request-response" paradigm as described with respect to FIGS. 12 A and 12B. In one embodiment, context across multiple requests is maintained by the application, and not by the Clearinghouse. In another, the Clearinghouse has logic that will recognize context across multiple "request-response" pairs.

For instance, if a "cashless voucher" is turned in for redemption at Participant A, and that voucher is "owned" by Participant B, the sequence of events that may need to take place may proceed as follows: 1) Participant "A" asks Participant "B" if it is "OK To Redeem Voucher", 2) Participant "B" determines it IS OK, so it responds with this information and places the voucher in a "Pending Redemption" state, 3) Participant "A" decides, since the voucher is OK, that it wants to actually redeem the voucher. Participant "A" sends the "Redeem Voucher" request to Participant "B", 4) Participant "B" sends back the "Voucher Redeemed" message to Participant "A".

In this example, two separate but linked "request-response" packets were transmitted through the Clearinghouse. To the Clearinghouse, these were two separate entities. However, to the Participants, they composed a single transaction. The Clearinghouse may either recognize the transaction (for logging purposes—logged as a single entity), or ignore the transactional significance (logged as two separate, equal entities), depending on the implementation and requirements.

In the methods described with respect to FIGS. 12A and 12B, the clearinghouse mediates, and possibly translates, all transactions between Participant (A) and Participant (B). There is no direct communication between (A) and (B), and thus, no need for (A) and (B) to have any prior knowledge of each other. The following are benefits of this type of scenario. First, mediation by the Clearinghouse prevents each Participant from having to know all of the other Participant's public keys. The Clearinghouse is the only entity that must know every Participant's public key. Second, the mediation by the Clearinghouse assures that each Participant must know only the neutral party's (the Clearinghouse) public key, and that the authentication of that knowledge is required with only that single party (the Clearinghouse). There needs to be no mutual authentication among the Participants of their public keys. Third, mediation by the clearinghouse allows a neutral party (the Clearinghouse) to log and store all transactions occurring between any Participants. This log can be used for dispute resolution. Fourth, mediation by the clearinghouse allows the middle party (the Clearinghouse) to perform translations and/or transformations on the data as a value-added feature. Translation capabilities allow each Participant to "talk" using a different language (protocol) if necessary. Fifth, mediation allows all Participants to move around the network, changing addresses at will. Rather than alerting all Participants of the change, the Participant only needs to alert the Clearinghouse. The clearinghouse then can update a table or database with the new address. Finally, mediation allows the Participants to trust the security of only one entity—the Clearinghouse. There are no cross—Participant trust issues. It is the Clearinghouse's responsibility to authenticate all of the Participants. For competitors using a clearinghouse, this feature may be beneficial.

Although the foregoing invention has been described in some detail for purposes of clarity of understanding, it will be apparent that certain changes and modifications may be practiced within the scope of the appended claims. For instance, while the gaming machines of this invention have been depicted as having top box mounted on top of the main gaming machine cabinet, the use of gaming devices in accordance with this invention is not so limited. For example, gaming machine may be provided without a top box.

What is claimed is:

1. A cashless instrument transaction network for generating cashless transactions between a plurality of separate gaming properties, each of which generates and validates cashless instruments, the cashless instrument transaction network comprising:

a cashless instrument transaction clearinghouse, the cashless instrument transaction clearinghouse comprising:

(i) a network interface allowing the cashless instrument transaction clearinghouse to communicate with each of the separate gaming properties; and (ii) a processor configured or designed to (a) receive cashless instrument validation requests via the network interface from a first property for a cashless instrument presented at the first property where the cashless instrument was generated at a second property (b) send information, via the network, to the second property requesting the second property to approve or reject the cashless instrument validation request;

at least one cashless gaming device, located at each of the plurality of separate gaming properties, that communicates with cashless instrument clearinghouse; and a network allowing communication between the cashless instrument clearinghouse and the cashless gaming devices.

2. The cashless transaction network of claim 1, wherein the cashless transaction clearinghouse further comprises a memory device that stores cashless gaming device public encryption keys for each of the cashless gaming devices.

3. The cashless transaction network of claim 2, wherein the processor is further designed or configured 1) to decrypt cashless transaction information encrypted with a cashless gaming device private encryption key using a corresponding cashless gaming device public encryption key and 2) to encrypt cashless transaction information using the public encryption keys.

4. The cashless transaction network of claim 1, wherein the cashless transaction clearinghouse further comprises a memory device that stores a clearinghouse private encryption key.

5. The cashless transaction network of claim 4, wherein the processor is further designed or configured 1) to decrypt cashless transaction information encrypted with a clearinghouse public encryption key using the clearinghouse private encryption key and 2) to encrypt cashless transaction information using the clearinghouse private encryption key.

6. The cashless transaction network of claim 1, wherein the gaming devices further comprise a memory device storing a clearinghouse public encryption key and a gaming device private encryption key.

7. The cashless transaction network of claim 6, wherein the gaming devices encrypts cashless transaction information using the clearinghouse public encryption key and decrypts cashless transaction information encrypted with a clearinghouse private key using the clearinghouse public encryption key.

8. The cashless transaction network of claim 6, wherein the gaming device encrypts cashless transaction information using the gaming device private encryption key and decrypts cashless transaction information encrypted with a gaming device public encryption key using the gaming device private encryption key.

9. The cashless transaction network of claim 1, wherein the cashless gaming devices encrypt and decrypt cashless transaction information.

10. The cashless transaction network of claim 1, wherein the processor is further designed or configured to encrypt and decrypt cashless transaction information.

11. The cashless transaction network of claim 1, wherein the network comprises a local area network, a wide area network, the Internet, a private intranet and combinations thereof.

12. The cashless transaction network of claim 1, wherein the cashless gaming device is selected from the group consisting of a gaming machine, a hand-held computing device, a clerk validation terminal and a cashless server.

13. The cashless transaction network of claim 1, wherein the processor is further designed or configured to allow promotional credits issued to a cashless instrument at a first gaming property to be used for game play at a second gaming property.

14. A method in an cashless instrument transaction clearinghouse of communicating with a plurality of gaming properties each of which generates and validates cashless instruments, the method comprising:

sending a clearinghouse public encryption key to a cashless gaming device at each of the plurality of gaming properties wherein the clearinghouse public encryption key is part of a public-private encryption key pair generated at the clearinghouse;

receiving a public encryption key from a gaming device at each of the plurality of gaming properties wherein each public encryption key is a part of a public-private encryption key pair generated at each property;

authenticating a sender of each of the public encryption keys received at the clearinghouse;

generating a message for each property wherein the message includes information at least encrypted with the property's public encryption key and a clearinghouse private encryption pair that is part of the public-private encryption key pair generated at the clearinghouse; and sending the message to each property wherein the cashless instrument transaction clearinghouse at least (i) receives cashless instrument validation requests from a first property for a cashless instrument presented at the first property where the cashless instrument was generated at a second property and (ii) sends information to a second gaming property requesting the second property to approve or reject the cashless instrument validation request.

15. A method in an cashless instrument transaction clearinghouse of communicating with a plurality of gaming properties each of which generates and validates cashless instruments, the method comprising:

receiving a first message addressed to a second property from a first property wherein the message includes encrypted cashless transaction information;

authenticating an identity of the first message sender;

decrypting the encrypted cashless transaction information;

identifying an address for the second property;

encrypting the cashless transaction information for second message addressed to the second property; and sending the second message with the encrypted cashless transaction information to the second property;

wherein the cashless instrument transaction clearinghouse at least (i) receives cashless instrument validation requests from a first property for a cashless instrument presented at the first property where the cashless instrument was generated at a second property and (ii) sends information to a second gaming property requesting the second property to approve or reject the cashless instrument validation request.

16. The method of claim 15, further comprising:

operating on the cashless transaction information.

17. The method of claim 15, further comprising:

storing the cashless transaction information.

18. The method of claim 15, further comprising:

translating the cashless transaction information from a first format used by the first property to a second format used by the second property.

19. The method of claim 15, wherein the cashless information in the first message is encrypted with a symmetric encryption key.

20. The method of claim 15, wherein the cashless transaction information in the first message is encrypted using a public-private encryption key pair.

21. The method of claim 15, wherein the first message includes an encrypted symmetric encryption key.

22. The method of claim 21, further comprising:

decrypting the symmetric encryption key.

23. The method of claim 21, wherein the symmetric encryption key is encrypted at the first property using a public-private encryption key pair.

24. The method of claim 21, wherein the symmetric encryption key is encrypted twice at the first property using a first property private encryption key from a first public-private encryption key pair and using a clearinghouse public encryption key from a second public-private encryption key pair.

25. The method of claim 24, wherein the symmetric encryption key is decrypted at the clearinghouse using a first property public encryption key from the first public-private encryption key pair and is decrypted using a clearinghouse private encryption key from the second public-private encryption key pair.

26. The method of claim 25, wherein the cashless transaction information for the second message is encrypted with a symmetric encryption key.

27. The method of claim 15, wherein the cashless transaction information for the second message is encrypted using a public-private key pair.

28. The method of claim 15, further comprising:
generating a first symmetric encryption key;
encrypting the cashless transaction information for the second message with the first symmetric encryption key;
encrypting the first symmetric encryption key; and
generating the second message with the encrypted first symmetric encryption key and the encrypted cashless transaction information.

29. The method of claim 28, wherein the first symmetric encryption key is encrypted at the clearinghouse using a clearinghouse private encryption key from a first public-private encryption key pair and using a public encryption key from a second public-private encryption key pair.

30. The method of claim 28, further comprising:
receiving from the second party a third message comprising at least encrypted cashless transaction information and an encrypted second symmetric encryption key;
decrypting the second symmetric encryption key
and comparing the second symmetric encryption key to the first symmetric encryption key to authenticate the message sender.

31. The method of claim 15, further comprising:
receiving from the second party a third message and
authenticating the message sender.

32. A method in a first cashless gaming device located at a first gaming property which generates and validates cashless instruments of communicating instruments via a cashless instrument transaction clearinghouse with a second cashless gaming device located at a second gaming property which generates and validates cashless, the method comprising:
generating cashless transaction information;
encrypting the cashless transaction information; and
sending a first message addressed to the second gaming property with at least the cashless transaction information to the cashless transaction clearinghouse
wherein the cashless instrument transaction clearinghouse at least (i) receives cashless instrument validation requests from a first property for a cashless instrument presented at the first property where the cashless instrument was generated at a second property and (ii) sends information to a second gaming property requesting the second property to approve or reject the cashless instrument validation request.

33. The method of claim 32, further comprising:
generating the first message.

34. The method of claim 32, wherein the gaming device is selected from the group consisting of a gaming machine, a cashless server, a hand-held computing device and a clerk validation terminal.

35. The method of claim 32, wherein the cashless transaction information is encrypted with one or more of a symmetric encryption key, a public encryption key of a public-private encryption key pair, a private encryption key of a public-private encryption key pair and combinations thereof.

36. The method of claim 32, further comprising:
receiving a second message from the cashless instrument transaction clearinghouse; and
authenticating a sender of the second message.

37. The method of claim 36, further comprising:
decrypting cashless transaction information included in the second message.

38. The method of claim 37, wherein the information is decrypted with one or more of a symmetric encryption key, a public encryption key of a public-private encryption key pair, a private encryption key of a public-private encryption key pair and combinations thereof.

39. The method of claim 32, further comprising:
generating a symmetric encryption key and
encrypting the cashless instrument information with the symmetric encryption key.

40. The method of claim 39, further comprising:
encrypting the symmetric encryption key;
generating a second message with the encrypted symmetric encryption key and the encrypted cashless instrument information;
and sending the second message to the cashless instrument transaction clearinghouse.

41. A method in a cashless gaming device of authenticating a public encryption key from a cashless transaction instrument clearinghouse, the method comprising:
generating a symmetric encryption key using a seed shared with the clearinghouse;
encrypting a first information sequence with the symmetric encryption key;
sending a first message with the encrypted first information sequence to the clearinghouse;
receiving a second message with an encrypted second information sequence and encrypted clearinghouse public encryption key from the clearinghouse;
decrypting the second information sequence with the symmetric encryption key; and
authenticating the sender of the second message using the first information sequence and the second information sequence
wherein the cashless instrument transaction clearinghouse at least (i) receives cashless instrument validation requests from a first gaming property for a cashless instrument presented at the first property where the cashless instrument was generated at a second property and (ii) sends information to a second gaming property requesting the second property to approve or reject the cashless instrument validation request.

42. The method of claim 41, further comprising:
decrypting the clearinghouse public encryption key with the symmetric encryption key and
storing the clearinghouse public encryption key.

43. The method of claim 41, further comprising:
comparing the first information sequence to the second information sequence.

44. The method of claim 41, further comprising:
receiving the seed from the clearinghouse.

45. The method of claim 41, further comprising:
generating the first message.

46. The method of claim 41, further comprising:
encrypting information with the clearinghouse public encryption key and sending a message with the encrypted information to the clearinghouse.

47. The method of claim 41, wherein the first information sequence is a random noise sequence.

48. The method of claim 41, wherein the cashless instrument is selected from the group consisting of a smart card, a debit card, a bar-coded ticket and an EZ pay ticket voucher.

49. The method of claim 41, wherein the first information sequence and the second information sequence are identical.

50. A method in a cashless instrument transaction clearinghouse of sending a public encryption key to a cashless gaming device, the method comprising:

generating a symmetric encryption key using a seed shared with the cashless gaming device;

receiving a first message with an encrypted information sequence from the cashless gaming device;

decrypting the information sequence with the symmetric encryption key;

encrypting the information sequence with the symmetric encryption key;

encrypting a clearinghouse public encryption key with the symmetric encryption key; and sending a second message, with (i) the information sequence encrypted with symmetric encryption key and (ii) the public encrypted key encrypted with the symmetric encryption key, to the clearinghouse;

wherein the cashless instrument transaction clearinghouse at least (i) receives cashless instrument validation requests from a first gaming property for a cashless instrument presented at the first property where the cashless instrument was generated at a second property and (ii) sends information to a second gaming property requesting the second property to approve or reject the cashless instrument validation request.

51. The method of claim 50, wherein the information sequence is a random noise sequence.

52. The method of claim 50, wherein the cashless instrument is selected from the group consisting of a smart card, a debit card, a bar-coded ticket and an EZ pay ticket voucher.

53. The method of claim 50, further comprising:

generating a encryption key pair including the clearinghouse public key and a clearinghouse private key.

54. The method of claim 50, further comprising:

generating the second message.

55. A method in a cashless gaming device of sending a public encryption key to a cashless instrument transaction clearinghouse and authenticating the public encryption key has been received by the clearinghouse, the method comprising:

generating a symmetric encryption key using a seed shared with the clearinghouse;

encrypting a cashless gaming device public encryption key with the symmetric encryption key;

encrypting the cashless gaming device public encryption key with a clearinghouse public encryption key;

sending a first message with the doubly encrypted cashless gaming device public encryption key to the clearinghouse;

receiving a second message with an encrypted information sequence;

decrypting the information sequence with the clearinghouse public encryption key;

decrypting the information sequence decrypted with clearinghouse public encryption key with the symmetric encryption key; and authenticating the sender of the second message using the cashless gaming device public encryption key and the information sequence wherein the cashless instrument transaction clearinghouse at least (i) receives cashless instrument validation requests from a first gaming property for a cashless instrument presented at the first property where the cashless instrument was generated at a second property and (ii) sends information to a second gaming property requesting the second property to approve or reject the cashless instrument validation request.

56. The method of claim 55, further comprising:

comparing the information sequence to the cashless gaming device public encryption key.

57. The method of claim 55, wherein the information sequence and the cashless gaming device public encryption key are identical.

58. The method of claim 55, further comprising:

generating an encryption key pair including the cashless gaming device public key and a cashless gaming device private key.

59. The method of claim 55, further comprising:

generating the first message.

60. The method of claim 55, further comprising:

receiving the seed from the clearinghouse.

61. The method of claim 55, further comprising:

receiving the clearinghouse public encryption key from the clearinghouse.

62. The method of claim 61, further comprising:

authenticating an identity of the sender of the clearinghouse public encryption key.

63. A method in a cashless instrument transaction clearinghouse of receiving a public encryption key from a cashless gaming device and authenticating an identity of the cashless gaming device, the method comprising:

generating a symmetric encryption key using a seed shared with the cashless gaming device;

receiving a first message with an encrypted cashless gaming device public encryption key from the cashless gaming device;

decrypting the information sequence with the symmetric encryption key;

decrypting the cashless gaming device public encryption key with the symmetric encryption key;

decrypting the cashless gaming device public encryption key with a clearing house private encryption key;

encrypting the cashless gaming device public encryption key with the clearinghouse public encryption key;

encrypting the cashless gaming device public encryption key encrypted with the clearinghouse public encryption key with the symmetric encryption key; and sending a second message with the doubly encrypted cashless gaming device public encryption key to the clearinghouse;

wherein the cashless instrument transaction clearinghouse at least (i) receives cashless instrument validation requests from a first gaming property for a cashless instrument presented at the first property where the cashless instrument was generated at a second property and (ii) sends information to a second gaming property requesting the second property to approve or reject the cashless instrument validation request.

64. The method of claim 63, further comprising:

storing the cashless gaming device public encryption key.

65. The method of claim 63, further comprising:

sending information encrypted with the cashless gaming device public encryption key to the cashless gaming device.

* * * * *